(12) United States Patent
Younce et al.

(10) Patent No.: US 9,819,436 B2
(45) Date of Patent: Nov. 14, 2017

(54) INTRANODAL ROADM FIBER MANAGEMENT APPARATUSES, SYSTEMS, AND METHODS

(71) Applicant: CORIANT OPERATIONS, INC., Naperville, IL (US)

(72) Inventors: Richard Y. Younce, Yorkville, IL (US); Yajun Wang, Naperville, IL (US); Julia Y. Larikova, Naperville, IL (US); Bradley R. Kangas, Saint Charles, IL (US)

(73) Assignee: Coriant Operations, Inc., Naperville, IL (US)

( * ) Notice: Subject to any disclaimer, the term of this patent is extended or adjusted under 35 U.S.C. 154(b) by 0 days.

(21) Appl. No.: 14/467,578

(22) Filed: Aug. 25, 2014

(65) Prior Publication Data

US 2015/0055952 A1     Feb. 26, 2015

Related U.S. Application Data

(60) Provisional application No. 61/869,905, filed on Aug. 26, 2013.

(51) Int. Cl.
    *H04J 14/00*     (2006.01)
    *H04J 14/02*     (2006.01)

(52) U.S. Cl.
    CPC ...... *H04J 14/0212* (2013.01); *H04J 14/0204* (2013.01); *H04J 14/0217* (2013.01)

(58) Field of Classification Search
    CPC .............. H04J 14/0212; H04J 14/0204; H04J 14/0217; H04B 10/27; H04B 10/0773;
(Continued)

(56) References Cited

U.S. PATENT DOCUMENTS

| 4,903,338 A | 2/1990 | Funke |
|---|---|---|
| 5,500,756 A | 3/1996 | Tsushima et al. |

(Continued)

FOREIGN PATENT DOCUMENTS

| EP | 1202595 | 5/2002 |
|---|---|---|
| EP | 1434374 | 6/2004 |

(Continued)

OTHER PUBLICATIONS

PCT International Search Report and Written Opinion of International Search Authority in PCT/JP2008/059672 dated Nov. 14, 2008.

(Continued)

*Primary Examiner* — Hibret Woldekidan
(74) *Attorney, Agent, or Firm* — Merchant & Gould, P.C.

(57) ABSTRACT

An intranodal reconfigurable optical add/drop multiplexer (ROADM) fiber management apparatus, and a system employing the apparatus. The apparatus comprises a plurality of ingress optical ports, a plurality of egress optical ports, and a plurality of optical interconnections interposed between ones of the plurality of ingress optical ports and ones of the plurality of egress optical ports. Each of the plurality of ingress optical ports corresponds to one of the plurality of egress optical ports. Each one of the plurality of ingress optical ports is optically coupled by way of the optical interconnections to at least one of the plurality of egress optical ports. Each one of the plurality of egress optical ports is optically coupled by way of the optical interconnections to at least one of the plurality of ingress optical ports.

22 Claims, 31 Drawing Sheets

(58) Field of Classification Search
CPC ........... H04Q 11/0005; H04Q 11/0001; H04Q 2011/0015; G02B 6/35; G02B 6/355
USPC ................. 398/45, 83, 48–50, 55, 56, 57, 79
See application file for complete search history.

(56) References Cited

U.S. PATENT DOCUMENTS

| | | | |
|---|---|---|---|
| 5,864,414 | A | 1/1999 | Barnsley et al. |
| 5,940,197 | A | 8/1999 | Ryu |
| 6,466,348 | B1 | 10/2002 | Izumi |
| 6,525,852 | B1 | 2/2003 | Egnell |
| 6,535,309 | B1 | 3/2003 | Terahara |
| 6,594,046 | B1 | 7/2003 | Nishino |
| 6,606,427 | B1 | 8/2003 | Graves et al. |
| 6,822,860 | B2 | 11/2004 | Owens |
| 6,868,201 | B1 | 3/2005 | Johnson et al. |
| 6,999,677 | B2 | 2/2006 | Graves et al. |
| 7,133,616 | B2 | 11/2006 | Caroli |
| 7,155,124 | B2 | 12/2006 | Peddanarappagari et al. |
| 7,184,666 | B1 | 2/2007 | Li et al. |
| 7,231,107 | B1 | 6/2007 | Zhong et al. |
| 7,236,704 | B1 | 6/2007 | Cao |
| 7,272,321 | B1 | 9/2007 | Kuo et al. |
| 7,292,786 | B1 | 11/2007 | Barbarossa et al. |
| 7,343,066 | B2 | 3/2008 | Doerr et al. |
| 7,558,284 | B2 * | 7/2009 | Shinomiya .......... H04J 14/0227 370/437 |
| 7,630,634 | B1 | 12/2009 | Boduch |
| 7,653,311 | B2 | 1/2010 | Kikuchi et al. |
| 7,751,714 | B2 | 7/2010 | Zhong et al. |
| 7,781,714 | B2 | 8/2010 | Lee et al. |
| 7,983,560 | B2 * | 7/2011 | Maki .................... H04J 14/0204 398/48 |
| 8,089,683 | B2 | 1/2012 | Holmes |
| 8,116,629 | B2 * | 2/2012 | Boduch ............... H04J 14/0204 398/82 |
| 8,190,027 | B2 | 5/2012 | Boduch et al. |
| 8,320,759 | B2 | 11/2012 | Boduch |
| 8,428,461 | B2 | 4/2013 | Boduch et al. |
| 8,447,183 | B2 * | 5/2013 | Boduch ............... H04J 14/0201 398/83 |
| 8,509,618 | B2 * | 8/2013 | Boertjes .............. H04J 14/0204 398/45 |
| 8,565,603 | B2 | 10/2013 | Boduch et al. |
| 8,737,776 | B2 * | 5/2014 | Boduch ............... H04J 14/0204 385/15 |
| 8,995,832 | B2 * | 3/2015 | Ji ........................ H04J 14/0212 398/43 |
| 9,008,514 | B2 * | 4/2015 | Boduch .................. H04J 14/021 385/16 |
| 9,252,910 | B2 * | 2/2016 | Roorda ............... H04J 14/0212 |
| 9,276,695 | B2 * | 3/2016 | Boduch ................. H04J 14/021 |
| 9,374,186 | B1 * | 6/2016 | Boduch ................. H04J 14/021 |
| 9,551,836 | B2 * | 1/2017 | Frankel ............... H04B 10/271 |
| 2001/0030797 | A1 | 10/2001 | Kosaka et al. |
| 2002/0021862 | A1 | 2/2002 | Zhou et al. |
| 2002/0057477 | A1 | 5/2002 | Rocca et al. |
| 2002/0080440 | A1 | 6/2002 | Li et al. |
| 2002/0093707 | A1 | 7/2002 | Katagiri et al. |
| 2002/0097469 | A1 | 7/2002 | Yee et al. |
| 2002/0101636 | A1 | 8/2002 | Xiao et al. |
| 2002/0145779 | A1 | 10/2002 | Strasser et al. |
| 2002/0186432 | A1 | 12/2002 | Roorda et al. |
| 2003/0002104 | A1 | 1/2003 | Caroli et al. |
| 2003/0007209 | A1 | 1/2003 | Liu et al. |
| 2003/0031452 | A1 * | 2/2003 | Simmons ............. G02B 6/3668 385/147 |
| 2003/0179741 | A1 | 9/2003 | Goergen |
| 2004/0028407 | A1 | 2/2004 | Noheji |
| 2004/0033079 | A1 | 2/2004 | Sheth et al. |
| 2004/0042712 | A1 | 3/2004 | Cho et al. |
| 2004/0076438 | A1 | 4/2004 | Lee |
| 2004/0042795 | A1 | 8/2004 | Doerr et al. |
| 2004/0175179 | A1 | 9/2004 | Xiao et al. |
| 2004/0184809 | A1 | 9/2004 | Miyata et al. |
| 2004/0190901 | A1 | 9/2004 | Fang |
| 2004/0247239 | A1 | 12/2004 | Eldada |
| 2005/0047795 | A1 | 3/2005 | Windover et al. |
| 2005/0078461 | A1 | 4/2005 | Dobbs et al. |
| 2005/0281558 | A1 | 12/2005 | Wang et al. |
| 2006/0034610 | A1 | 2/2006 | Akiyama et al. |
| 2006/0133804 | A1 | 6/2006 | Boduch et al. |
| 2006/0133807 | A1 | 6/2006 | Jenkins et al. |
| 2006/0177225 | A1 | 8/2006 | Paraschis et al. |
| 2007/0237524 | A1 | 10/2007 | Gerstel et al. |
| 2008/0008474 | A1 | 1/2008 | Boduch et al. |
| 2008/0013953 | A1 | 1/2008 | Boduch et al. |
| 2008/0013954 | A1 | 1/2008 | Boduch et al. |
| 2008/0260386 | A1 | 10/2008 | Boduch et al. |
| 2008/0267631 | A1 | 10/2008 | Collings et al. |
| 2009/0148166 | A1 | 6/2009 | Akiyama et al. |
| 2009/0232497 | A1 * | 9/2009 | Archambault ...... H04J 14/0206 398/50 |
| 2010/0124391 | A1 * | 5/2010 | Feuer .................. H04J 14/0204 385/24 |
| 2011/0076016 | A1 * | 3/2011 | Wisseman ........... H04J 14/0204 398/48 |
| 2012/0086203 | A1 * | 4/2012 | Agtuca .................... H02K 1/20 290/43 |
| 2012/0328239 | A1 * | 12/2012 | Fuerst ................. H04J 14/0212 385/20 |
| 2013/0108215 | A1 * | 5/2013 | Ticknor ................... G02B 6/35 385/17 |
| 2013/0195449 | A1 * | 8/2013 | Ghioni ................ H04J 14/0204 398/48 |
| 2015/0208146 | A1 * | 7/2015 | Younce .............. H04Q 11/0066 398/21 |

FOREIGN PATENT DOCUMENTS

| | | |
|---|---|---|
| EP | 1628424 A | 2/2006 |
| WO | 03/061330 A | 7/2003 |
| WO | 2008/008277 A | 1/2008 |

OTHER PUBLICATIONS

Lei Zang et al.; "A Novel Tunable DeMUX/MUX Solution for WSS-Based ROADM and WXC Nodes," Optical Fiber Communication Conference and Exposition National Fiber Optic Engineers Conference, OFCNFOEC 2007 25-29, Mar. 25-29, 2007, pp. 1-7.
A. Jajszczyk et al.; "An Architecture for a Photonic Fast Packed Switching Fabric," Proceedings of the Global Telecommunications Conference (Blobecom), New York, Dec. 2, 1991, pp. 1219-1223.
PCT International Search Report and Written Opinion of International Search Authority in PCT/US2009/001387 dated Sep. 9, 2009.
M.P. Earnshaw et al., "Planar Lightwave Circuit Based Reconfigurable Optical Add-Drop Multiplexer Architectures and Reusable Subsystem Module, IEEE Journal of Selected Topics in Quantum Electronics", vol. 11, No. 2, Mar./Apr. 2005, pp. 313-322.
European Office Action dated May 3, 2011, in counterpart European Application No. 07 796 705.7-2415.
PCT International Search Report and Written Opinion of International Search Authority in PCT/US2007/015541 dated Jun. 5, 2008.
European Search Report dated Nov. 29, 2010 in European Application No. 07 796 705.7-2415.
European Office Action dated Nov. 29, 2010 in European Application No. 07 796 705.7-2415.
Christophe Chauvet, European Search Report in Application No. 07 796 705.7 -2415, Mar. 5, 2011, p. 3-5.

* cited by examiner

FIG. 31
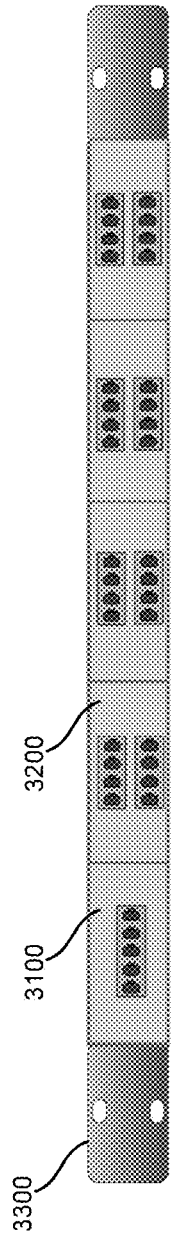
FIG. 32
FIG. 33
FIG. 34
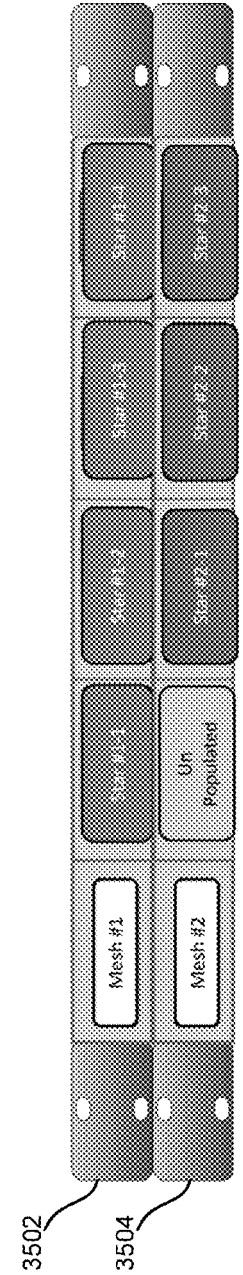
FIG. 35

INTRANODAL ROADM FIBER MANAGEMENT APPARATUSES, SYSTEMS, AND METHODS

CROSS-REFERENCE TO RELATED APPLICATION

This application claims priority to U.S. Provisional Application No. 61/869,905, filed on Aug. 26, 2013, the entire contents of which are hereby incorporated by reference as if set forth fully herein.

BACKGROUND

Field

Example aspects described herein relate generally to optical communication networks, and, more particularly, to intranodal reconfigurable optical add/drop multiplexer (ROADM) fiber management apparatuses, and methods and systems employing the apparatuses.

Description of Related Art

Wavelength-division multiplexing (WDM) optical networks are presently dominated by 10 gigabit per second (Gb/s) transmission on dispersion-managed fiber plants. Such networks are typically comprised of multiple nodes interconnected by WDM paths. Optical signals (also referred to interchangeably herein as "traffic", "wavelengths", and/or "channels") that are communicated across WDM networks typically originate at a first endpoint (a source system) that is local to one of the nodes (e.g., by way of a transmitter portion of local transponder) and terminate at a second endpoint (a destination system) that is local to another one of the nodes (e.g., by way of a receiver portion of local transponder). In some cases traffic is communicated from a source system at a source node to a destination system at a destination node without traversing any intermediate nodes. In other cases traffic is communicated from a source system at a source node to a destination system at a destination node by way of one or more intermediate nodes.

To facilitate the flow of traffic from source endpoints to destination endpoints throughout the network, each of the nodes includes a reconfigurable optical add/drop multiplexer (ROADM). As described in further detail below in the context of the various figures herein, a ROADM (which for convenience is also referred to interchangeably herein as a "node") typically includes one or more bidirectional WDM ports coupled to other nodes of the network by way of one or more bidirectional WDM paths that carry WDMs signals each having multiple individual channels. Each of the bidirectional WDM ports of the ROADM is referred to herein as a degree and includes an ingress WDM port and a corresponding egress WDM port. The ROADM also includes one or more local add ports and/or local drop ports coupled to one or more local source systems and/or destination systems, respectively, from which traffic may originate and/or terminate.

The ROADM of a particular node facilitates the flow of traffic through that node of the network by receiving traffic either from a source system local to that node by way of a local add port, or from another node by way of an ingress WDM port, and, depending on the intended destination for the traffic, routing the traffic either to a destination system local to that node by way of a local drop port, or to another node by way of an egress WDM port. Traffic that a ROADM receives by way of its ingress WDM port from another node of the network and routes by way of its egress WDM port to another node of the network is referred to as "express traffic."

Traffic that a ROADM either receives from a source system local to that node or routes to a destination system local to that node is referred to as "local traffic." More particularly, traffic that a ROADM receives from a source system local to that node by way of a local add port, and routes by way of its egress WDM port to another node of the network is referred to as "local add traffic." Traffic that a ROADM receives by way of an ingress WDM port from another node of the network, and routes by way of a local drop port to a destination system local to the node is referred to as "local drop traffic."

Carriers are beginning to build all-coherent networks to fulfill rising 100 Gb/s service demands and expand network capacity. Although 100 Gb/s is the initial target data rate, some operators desire that new networks also support future 400 Gb/s data rates. In order to support faster data rates and/or provide additional functionality, modifications to ROADM/node architectures may be needed.

Each ROADM includes multiple components (e.g., a line subsystem, an add/drop subsystem, and local transponders), which are coupled to one another by way of intranodal optical fiber paths. Each of the ROADM components may be implemented according to one of several different architectures, and therefore any particular ROADM can be implemented according to one of numerous possible configurations. New node architectures should be flexible enough to support additional functionality and/or future transmission formats and as they become available. For instance, fixed filtering using a wavelength selective switch (WSSs) and a fixed add/drop structure (e.g., a fixed filtered AWG) may not fulfill the needs of 400 Gb/s service, which may require variability in bandwidth. In such a case, flexible grid wavelength selective switches (WSS) and add/drop elements with programmable center frequencies and bandwidths (i.e. colorless add/drop elements) may be desirable to provide colorless functionality. In some cases, in addition to colorless functionality, further architectural enhancements may be desired, such as colorless and directionless (CD) functionality employing a route-and-select WSS and a directionless add/drop element, and/or colorless, directionless, and contentionless (CDC) functionality employing a contentionless add/drop element as well.

Additionally, node modifications may also be needed to configure the node to accommodate an increased number of degrees and/or an increased number of add/drop modules, depending on the particular application. Thus, node configurations may vary from node to node and may change over time as needs evolve.

Management of the numerous intranodal optical fiber paths to be established between ROADM components (e.g., between the line subsystem and the add/drop subsystem) can be complex and burdensome, and the complexity and burden are only compounded by the needs for node architecture modification and flexibility described above. Installation and maintenance of the intranodal fiber paths can be operationally difficult and prone to error.

In some cases, fiber ribbon cables (each of which includes multiple, e.g., 12, fibers) may be employed to reduce the number of cables employed for establishing intranodal fiber paths. Such ribbon cables typically are terminated by a single multiple-fiber push-on/pull-off (MPO) connector at each end that contains all 12 terminating fibers. However, as shown in FIG. 4 (described in further detail below), a ROADM is often configured such that its intranodal fiber paths are meshed, in that fibers from a single module of the ROADM are routed to a variety of other modules of the ROADM. Therefore, although coupling MPO-to-MPO ribbon cables directly between ROADM modules may decrease the complexity of managing the intranodal fiber paths somewhat, such an approach may not enable the ROADM to provide the mesh topology often required of intranodal ROADM paths.

SUMMARY

Existing limitations associated with the foregoing, as well as other limitations, can be overcome by intranodal reconfigurable optical add/drop multiplexer (ROADM) fiber management apparatuses (also referred to herein as a "fiber shuffles" and/or as "fiber interconnection apparatuses") and systems and methods that employ such apparatuses to simplify the management of intranodal ROADM fiber paths.

In one example embodiment herein, the apparatus includes a plurality of ingress optical ports, a plurality of egress optical ports, and a plurality of optical interconnections interposed between ones of the plurality of ingress optical ports and ones of the plurality of egress optical ports. Each of the plurality of ingress optical ports corresponds to one of the plurality of egress optical ports. Each one of the plurality of ingress optical ports is optically coupled by way of the optical interconnections to at least one of the plurality of egress optical ports. Each one of the plurality of egress optical ports is optically coupled by way of the optical interconnections to at least one of the plurality of ingress optical ports.

In one example, for each one of the plurality of ingress optical ports, the one of the plurality of ingress optical ports is optically coupled by way of the optical interconnections to each one of the plurality of egress optical ports, excluding one of the plurality of egress optical ports that corresponds to the one of the plurality of ingress optical ports.

According to another example embodiment, the apparatus is housed in a single rack mountable enclosure, the enclosure including a plurality of ingress optical connectors by which respective ones of the plurality of ingress optical ports are accessible, and a plurality of egress optical connectors by which respective ones of the plurality of egress optical ports are accessible.

Also in one example embodiment herein, the plurality of optical interconnections is comprised of a plurality of topology modules including at least one of a mesh topology module and a star topology module.

In a further example embodiment herein, a contiguous group of ones of the plurality of ingress optical connectors is coupled, by way of the mesh topology module, to ones of the plurality of egress optical connectors that are adjacently arranged in the enclosure. In addition, at least one of the plurality of ingress optical connectors and a corresponding at least one of the plurality of egress optical connectors are terminated at a common termination, in one example.

In one example, a group of ones of the plurality of ingress optical connectors is coupled, by way of the star topology module, to a group of ones of the plurality of egress optical connectors, and at least one pair of corresponding ones of the optical ingress connectors and the optical egress connectors that is not included in the star topology module is interposed in the enclosure between the group of ones of the plurality of ingress optical connectors and the group of ones of the plurality of egress optical connectors.

According to another example embodiment, the enclosure includes one or more vacant slots that can accommodate one or more additional topology modules.

Also in one example embodiment herein, individual ones of the plurality of ingress optical connectors correspond to respective ones of the plurality of egress optical connectors.

In a further example embodiment herein, the plurality of optical interconnections is comprised of a plurality of topology modules including at least one of a mesh topology module and a star topology module. Each of the plurality of topology modules is coupled to at least one of (1) a contiguous group of adjacent ones of the plurality of ingress optical connectors and (2) a contiguous group of adjacent ones of the plurality of egress optical connectors.

In one example, each of the plurality of ingress optical ports includes a plurality of ingress optical fibers, and each of the plurality of egress optical ports includes a plurality of egress optical fibers.

According to another example embodiment, a total number of the plurality of optical ingress ports included in the apparatus is equal to a total number of the plurality of optical egress ports included in the apparatus.

In another example embodiment herein, an intranodal ROADM fiber management system is provided. The system includes a line subsystem including a plurality of line degree modules, an add/drop subsystem including a plurality of add/drop modules, a plurality of local transponders, and a fiber management apparatus. One or more of the plurality of line degree modules is communicatively coupled to one or more of the local transponders by way of the fiber management apparatus and one or more of the add/drop subsystems.

In a further example embodiment herein, the fiber management apparatus included in the system comprises a plurality of ingress optical ports, a plurality of egress optical ports, and a plurality of optical interconnections interposed between ones of the plurality of ingress optical ports and ones of the plurality of egress optical ports. Each of the plurality of ingress optical ports corresponds to one of the plurality of egress optical ports. Each one of the plurality of ingress optical ports is optically coupled by way of the optical interconnections to at least one of the plurality of egress optical ports. Each one of the plurality of egress optical ports is optically coupled by way of the optical interconnections to at least one of the plurality of ingress optical ports.

In one example, the plurality of line degree modules include at least one of (1) a broadcast and select line degree module that includes a splitter and a select wavelength selective switch (WSS) and (2) a route and select line degree module that includes a route WSS and a select WSS.

According to another example embodiment, the plurality of add/drop modules includes at least one of (1) a colorless, directionless, and contentionless (CDC) add/drop module having an erbium doped fiber amplifier and a multicast switch and (2) a low port count (LPC) CDC add/drop module.

Also in one example embodiment herein, the system further includes at least one expansion fiber management apparatus, and one or more of the plurality of line degree modules is communicatively coupled to one or more of the local transponders by way of the fiber management apparatus, the expansion fiber management apparatus, and one or more of the add/drop subsystems.

In a further example embodiment herein, the expansion fiber management apparatus includes a plurality of expansion line degree modules. The a plurality of expansion line degree modules include at least one of (1) a broadcast and select expansion line degree module that includes a splitter and a select wavelength selective switch (WSS) and (2) a route and select expansion line degree module that includes a route WSS and a select WSS.

In one example, the fiber management apparatus is housed in a first rack mountable enclosure, and the expansion fiber management apparatus is housed in a second rack mountable enclosure.

According to another example embodiment, at least two of (1) one or more of the plurality of line degree modules, (2) one or more of the plurality of add/drop modules, (3) one or more of the plurality of local transponders, and (4) the fiber management apparatus are optical coupled to one another by way of one or more optical ribbon cables.

Also in one example embodiment herein, the system is coupled to an optical network by way of at least one wavelength division multiplexed path.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, wherein:

FIG. 31 shows an example 5-port mesh topology module that can be used to construct a fiber shuffle, in accordance with an example embodiment herein.

FIG. 32 shows an example 8-port star topology module that can be used to construct a fiber shuffle, in accordance with an example embodiment herein.

FIG. 33 shows an example 21-port 4-degree shuffle, in accordance with an example embodiment herein.

FIG. 34 shows an example 21-port 4-degree shuffle with blocks indicating how a mesh topology module and star topology modules are mapped, in accordance with an example embodiment herein.

FIG. 35 shows an example construction of an 8-degree 21-port shuffle, that employs two 1-rack unit mountable shelves, in accordance with an example embodiment herein.

DETAILED DESCRIPTION

Presented herein are novel and inventive intranodal reconfigurable optical add/drop multiplexer (ROADM) fiber management apparatuses (sometimes referred to herein as fiber shuffles), and systems and methods employing the apparatuses. In accordance with some aspects described herein, as described below in further detail, the apparatuses, methods, and systems employ a modularized fiber shuffle, in some cases together with fiber ribbon cables, to greatly simplify the management of intranodal (i.e., intra-ROADM) paths for express and local add/drop channels in an optical network. In some example embodiments, to aid in the installation, test, and identification of intranodal interconnections, optical test channels can be routed between modules (e.g., line degree modules, CDC add/drop modules, expansion modules, local transponders, etc.) in parallel with the add, drop, and/or express channels using a separate WDM channel. The test channels can be used between the modules to verify proper intranodal fiber setup, failure analysis, and to discover the port interconnections between the modules within the node.

Additionally, in accordance with various example aspects described herein, fiber shuffles are provided that are flexible enough to manage a range of numbers of ROADMs and types of ROADM modules (e.g., line degree modules, CDC add/drop modules, local transponders, expansion modules, etc.). The fiber shuffle includes a plurality of ports, each of which can be used for various types of modules of a ROADM.

Figure 1:
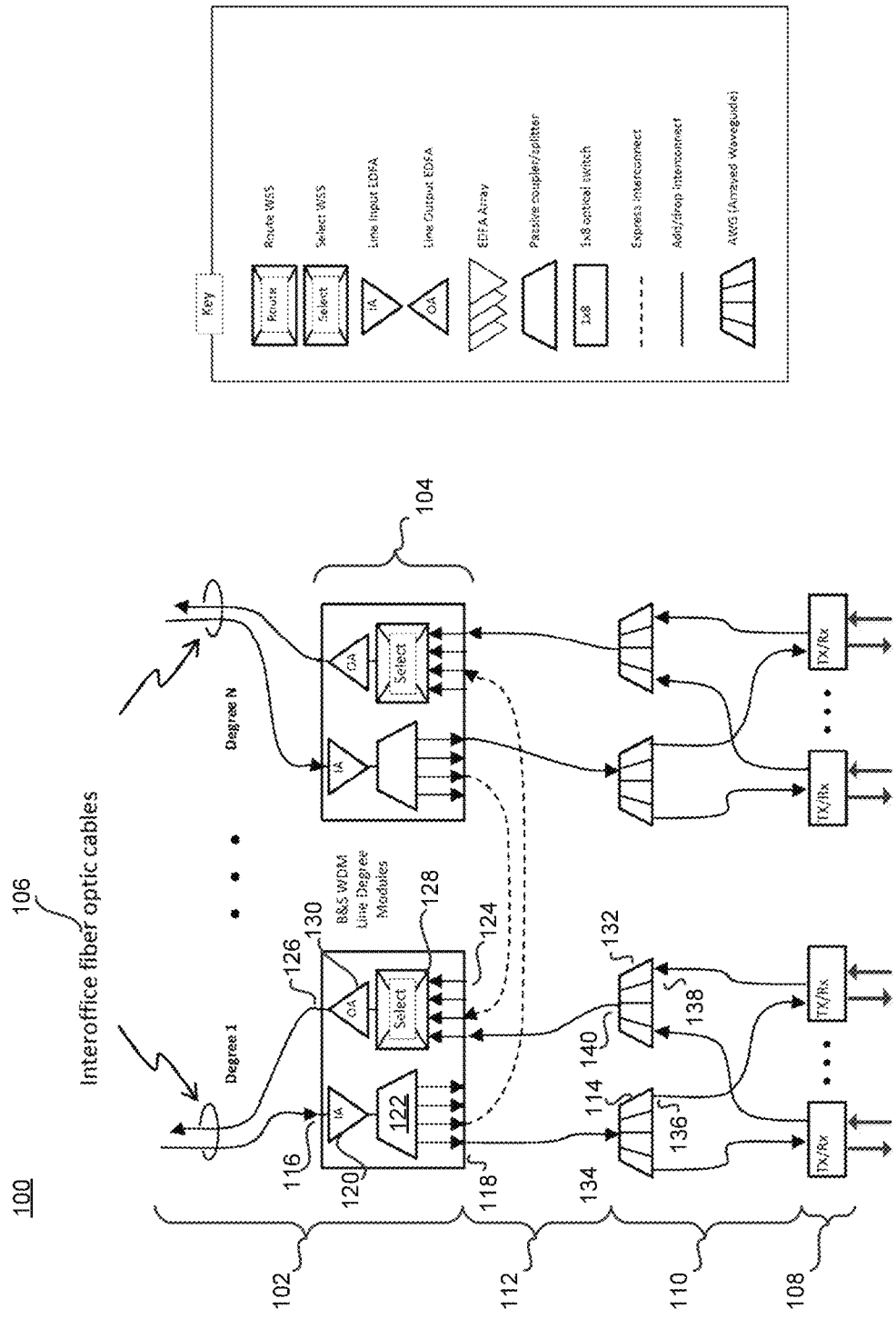
FIG. 1 shows an architecture of an example ROADM, in accordance with at least one example aspect herein.

FIG. 1 shows an architecture of an example N-degree ROADM 100. In this example, the ROADM 100 represents one node of a multiple-node WDM optical network (not shown in FIG. 1). Before describing how the ROADM 100 functions, a description of the components of the ROADM 100 and how those components are interconnected will be provided. It should be understood that each of components of the ROADM 100 described herein may be implemented according to one of several different architectures. Therefore the ROADM 100 can be implemented according to one of numerous possible configurations.

In the example of FIG. 1, fiber paths throughout the ROADM 100 and/or throughout the network are symmetrical, with one fiber being used to transmit optical signals between two points in a first direction, and a second fiber being used to transmit optical signals between those two points in the opposite direction; however, this example should not be construed as limiting. Each degree of the N-degree ROADM 100 is coupled to the network (not shown in FIG. 1) by way of a respective pair of interoffice WDM paths 106 (e.g., interoffice fiber optic cables), including an ingress WDM path and an egress WDM path.

As shown in FIG. 1, the ROADM 100 includes a line degree subsystem 102, intranodal fiber paths 112, an add/drop subsystem 110, and local transponders 108. For convenience, the following description of components of the ROADM 100 is provided in the context of one of the degrees of the ROADM 100. A similar description applies to the components of each other degree of the ROADM 100 as well.

The line degree subsystem 102 includes multiple (e.g., N) WDM line degree OADM modules 104, one per each degree of the ROADM 100. In the example of FIG. 1, the WDM line degree OADM modules 104 are broadcast-and-select type line degree modules that include an input amplifier 120, a broadcast splitter 122, a select WSS module 128, and an output amplifier 130. The ingress portion of the WDM path 106 is coupled to an ingress port 116 of the line degree module 104, which is coupled to a multiple-fiber broadcast output port 118 of the line degree module 104 by way of the input amplifier 120 and the splitter 122. A multiple-fiber select input port 124 of the line degree module 104 is coupled to the egress portion of the WDM path 106 by way of the select WSS module 128, the output amplifier 130, and an egress port 126 of the line degree module 104. As described below, because of the broadcasting and selecting functions performed by the splitter 122 and the WSS 128, respectively, the architecture of the example line subsystem 102 shown in FIG. 1 is sometimes referred to as a broadcast-and-select architecture.

In the example of FIG. 1, the add/drop subsystem 110 includes a plurality of arrayed waveguide (AWG) modules 114 and 132, with each degree having an ingress AWG module 114 and an egress AWG module 132. One fiber of the multiple-fiber output port 118 of the line degree module 104 is coupled to an input port 134 of the ingress AWG module 114 by way of a respective one of the intranodal fiber paths 112 (e.g., a local drop traffic path, as described below). Each other fiber of the multiple-fiber output port 118 of the line degree module 104 is coupled, by way of a respective one of the intranodal fiber paths 112, to a respective fiber of the multiple-fiber select input port 124 of a respective one of the other line degree modules 104 that corresponds to one of the other degrees of the ROADM 100 (e.g., an express traffic path, as described below). In this way, the example ROADM 100 shown in FIG. 1 may be described as "colored" and "directional", meaning that any one of the local transponders 108 that is plugged into a specific port of the ingress AWG module 114 or the egress AWG module 132, which in turn is tied to a specific one of the degrees of line subsystem 102, can only communicate at one specific wavelength (or color) and with one specific distant node (or end office).

Each of the local transponders 108 includes a receiver portion that is coupled to a corresponding local destination system (not shown in FIG. 1) for local drop traffic, and a transmitter portion that is coupled to a corresponding local source system (not shown in FIG. 1) for local add traffic. For local drop traffic, each fiber of the multiple-fiber output port 136 of the ingress AWG module 114 is coupled to a respective one of the local destination systems by way of a receiving portion of a respective one of the local transponders 108. For local add traffic, each one of the local source systems is coupled to a respective fiber of the multiple-fiber input port 138 of the egress AWG module 132 by way of a respective one of the transmitting portions of a respective one of the local transponders 108. An output port 140 of the egress AWG module 140 is coupled to a respective fiber of the multiple-fiber input port 124 of the select WSS module 128 of the line degree module 104.

Broadcast-and-select line subsystem architectures, such as that shown in FIG. 1 (102) have two drawbacks when it comes to expressing 400 Gb/s signals. First, the nodal optical signal-to-noise ratio (OSNR) decreases with higher degree counts. This is due to the higher loss with large split ratios in the broadcast splitter 122 (shown in FIG. 1 with only 4 ports but typically has more than 4 ports). This may not be problematic for applications employing low degree counts and robust modulation formats such as quadrature phase-shift keying (QPSK). But with the higher OSNR requirement of quadrature amplitude modulation (QAM) applications and higher port counts desired to support flexible add/drop structures, the broadcast-and-select architecture may limit 400 Gb/s network reach.

A second drawback with the broadcast-and-select line architecture is the port isolation in the select WSS (e.g., 128). Each WSS 128 receives input channels broadcasted by splitters 122 from multiple ingress degrees and input channels provided by multiple local transponders 108. The WSS 128 selects single wavelengths for transmission, but signals from unselected wavelengths (e.g., from other degrees) may not be perfectly blocked. This may not be problematic for applications with low degree counts and tolerant transmission formats, but it may limit QAM in high port count scenarios. Thus, in some cases a different architecture can be employed as the line degree subsystem 102, such as a route-and-select architecture described below.

Having described the components of the ROADM 100 and how those components are interconnected, a description of how the components of the ROADM 100 function will now be provided. As mentioned above, each individual optical channel signal (e.g., 4 also referred to interchangeably herein as "traffic", a "wavelength", and/or a "channel") that is communicated across the multiple-node WDM network originates at a first endpoint (a source system) that is local to one of the ROADMs and terminates at a second endpoint (a destination system) that is local to another one of the ROADMs. The signal (e.g., $\lambda_1$) can be communicated from a source system local to a source ROADM to a destination system local to a destination ROADM without traversing any intermediate ROADMs. The signal can also be communicated from a source system local to a source ROADM to a destination system local to a destination ROADM by way of one or more intermediate ROADMs. In general, the ROADM 100 functions by facilitating the flow of signals through that particular node, for example, by multiplexing and/or routing signals so that they reach the intended destination systems, which may be local to the ROADM 100 or may instead be local to a distant ROADM of the network.

Traffic that the ROADM 100 receives from another ROADM of the network, and routes (referred to as passthrough switching) to yet another ROADM of the network, is referred to as "express traffic." Traffic that the ROADM 100 receives from a source system local to the ROADM 100, and routes to another ROADM of the network is referred to as "local add traffic." Traffic that the ROADM 100 receives from another ROADM of the network, and routes to a destination system local to the ROADM 100 is referred to as "local drop traffic."

Thus, for a given individual wavelength or channel signal (e.g., $\lambda_1$), the ROADM 100 may be (1) local to a source system from which the signal originates, (2) local to a destination system to which the signal is to be communicated, or (3) an intermediate ROADM, local neither to the source nor the destination system of the signal, that forwards the signal along its path to the destination system which is local to another ROADM of the network. Under each of these three scenarios, the individual wavelength or channel signal (e.g., $\lambda_1$) traverses a different path through the components of the ROADM 100, as described in further detail below.

In a case where the individual wavelength signal (e.g., $\lambda_1$) is a local drop signal to be communicated to a destination system local to the ROADM 100, the following is an example path through which the signal can traverse. The signal (e.g., $\lambda_1$) is one wavelength of a multiple-wavelength (e.g., $\lambda_1$ to $\lambda_n$) WDM signal that is received at the input port 116 of the input amplifier 120, from the output port 126 of another ROADM (not shown in FIG. 1) by way of an ingress path of the WDM paths 106. The WDM signal is then amplified by the input amplifier 120, and then broadcasted to the input port 134 of the ingress AWG module 114 (as part of the local drop path) and to respective fibers of the multiple-fiber input port 124 of the select WSS modules 128 of the other degrees of the ROADM (as part of express traffic paths), by way of respective fibers of the multiple-fiber output port 118 of the splitter 122 and respective ones of the intranodal paths 112. The ingress AWG module 114 demultiplexes the WDM signal (e.g., $\lambda_1$ to $\lambda_n$) received at the input port 134 into its individual constituent wavelengths (e.g., one of which is $\lambda_1$), and provides (i.e., drops) each wavelength to a destination system local to the ROADM 100 by way of a receiving portion of a respective one of the local transponders 108.

In a case where the individual wavelength signal (e.g., $\lambda_1$) is a local add signal that is to be communicated from a source system local to the ROADM 100 to a destination system that is local to another distant ROADM (not shown in FIG. 1) of the network, the following is an example path the signal can traverse. The signal (e.g., $\lambda_1$) is transmitted (i.e., added) by a source system local to the ROADM 100 to a respective fiber of the multiple-fiber input port 138 of the egress AWG module 132 by way of a transmitting portion of a respective one of the local transponders 108. The egress AWG module 132 multiplexes the signal (e.g., $\lambda_1$) into a WDM signal (e.g., $\lambda_1$ to $\lambda_n$) that also includes wavelengths received from other source systems local to the ROADM 100, and provides the WDM signal to a respective fiber of the multiple-fiber input port 124 of the select WSS module 128 by way of a respective one of the intranodal fiber paths 112. In addition to the WDM signal (e.g., $\lambda_1$ to $\lambda_n$) received from the output port 140 of the egress AWG module 140, the select WSS module 128 also receives multiple other WDM signals, one per input fiber of the input port 124, from egress AWG modules 132 and/or splitters 122 of other degrees of the ROADM 100. The select WSS module 128 selects (passes) specific ones of the individual wavelengths signals (e.g., $\lambda_1$) that are part of the WDM signals received at the fibers of input port 124, and blocks other ones of the individual wavelengths signals (e.g., $\lambda_1$) that are part of the WDM signals received at the fibers of input port 124. A WDM signal (e.g., $\lambda_1$ to $\lambda_n$) including only the individual wavelengths signals (e.g., $\lambda_1$) selected by the select WSS module 128 is amplified by the output amplifier 130, and then provided to its destination in the network by way of an egress path of the WDM paths 106.

In a case where the ROADM 100 is not local to the source system or the destination system of the signal, but instead is intermediate to the source or the destination system of the signal (which is an express signal), the following is an example path through which the signal can traverse. The signal (e.g., $\lambda_1$) is one wavelength of a multiple-wavelength (e.g., $\lambda_1$ to $\lambda_n$) WDM signal that is received at the input port 116 of the input amplifier 120, from the output port 126 of another ROADM (not shown in FIG. 1) by way of an ingress path of the WDM paths 106. The WDM signal is then amplified by the input amplifier 120, and then broadcasted to the input port 134 of the ingress AWG module 114 (as part of the local drop path, described above) and to respective fibers of the multiple-fiber input port 124 of the select WSS modules 128 of the other degrees of the ROADM (as part of express traffic paths now described), by way of respective fibers of the multiple-fiber output port 118 of the splitter 122 and respective ones of the intranodal paths 112. A select WSS module 128 of a respective one of the other line degree modules 104 of the ROADM 100 selects (passes) specific n ones of the individual wavelength signals (e.g., including the express signal $\lambda_1$) that are part of the WDM signals received at the fibers of input port 124, and blocks all other ones of the individual wavelengths signals that are part of the WDM signals received at the fibers of input port 124. A WDM signal (e.g., $\lambda_1$ to $\lambda_n$) including only the n individual wavelength signals (e.g., $\lambda_1$) selected by the select WSS module 128 is amplified by the output amplifier 130, and then provided to its destination in the network by way of an egress path of the WDM paths 106.

Figure 2:
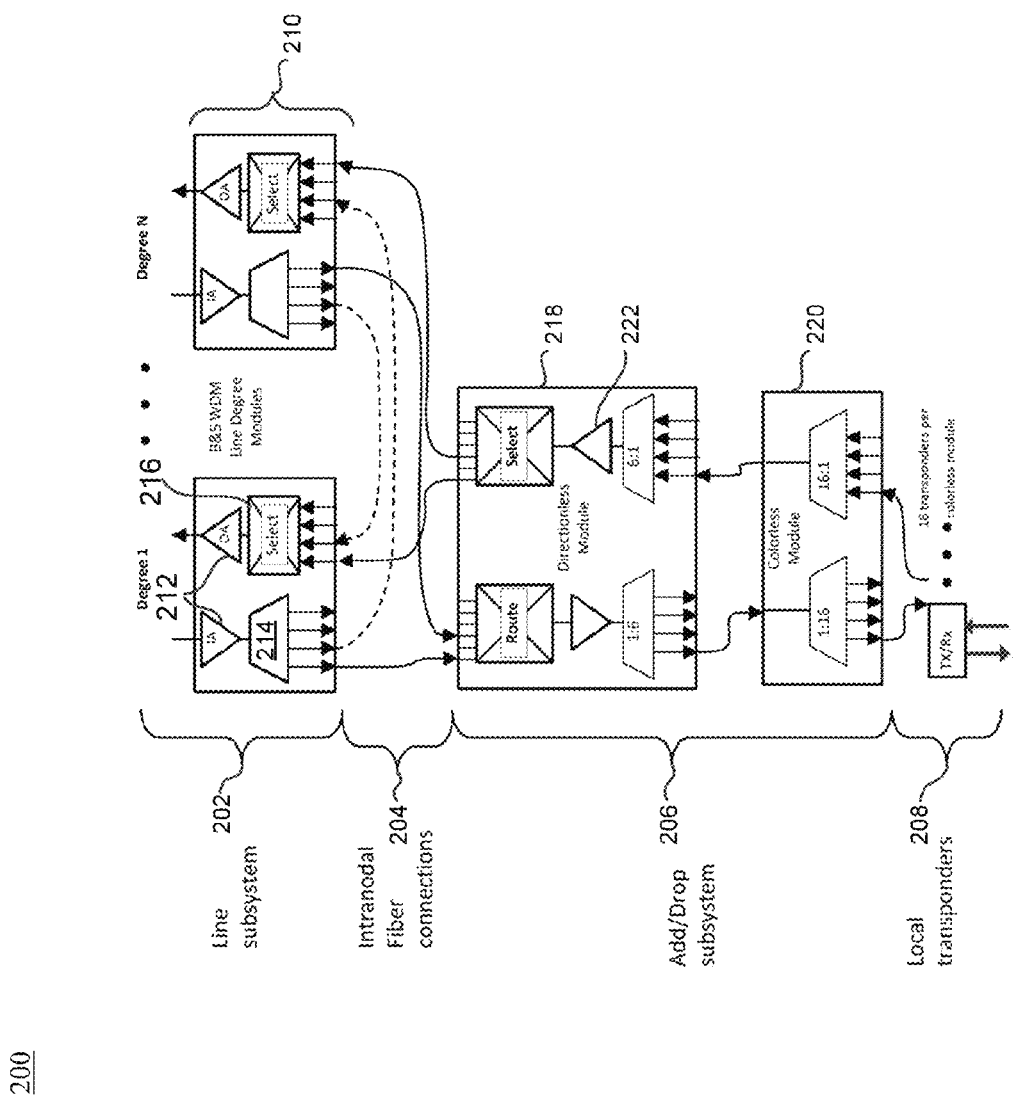
FIG. 2 shows an example ROADM that employs a broadcast-and-select architecture, in accordance with an example embodiment described herein.

Having described the components and functionality of the example ROADM 100, reference will now be made to FIG. 2 to illustrate an example ROADM 200 that employs an alternative add/drop subsystem architecture, in accordance with an example embodiment herein. As shown in FIG. 2, the ROADM 200 includes many of the same components (e.g., the line subsystem 202, intranodal fiber paths 204, add/drop subsystem 206, and local transponders 208) as those that were described above in connection with the ROADM 100 of FIG. 1. Because the components that appear in both ROADM 100 and ROADM 200 are configured and function in a similar manner as described above in the context of FIG. 1, a complete description of the configuration and functionality of each component of FIG. 2 will not be repeated here.

However, one difference between the ROADM 100 and the ROADM 200 is that, whereas the ROADM 100 employs an AWG architecture add/drop subsystem 110, the ROADM 200 employs a two-tiered colorless and directionless (CD) add/drop subsystem 206. Since the two-tiered colorless and directionless add/drop subsystem 206 functions in a known manner to route signals between the local add/drop transponders 208 and the line degree subsystem 202, a complete description of its functionality is not provided herein. In general, the add/drop subsystem 206 aggregates add channels from the local transponders 208 and presents the aggregated add channels to the line subsystem 202 for transmission to a destination in the network. The add/drop subsystem 206 also routes drop channels from the line subsystem 202 to receivers in the local transponders 208.

The add/drop subsystem 206 includes a directionless switch module 218 and a colorless fan-out module 220. Although the add/drop subsystem 206 is shown in FIG. 2 as being coupled to a broadcast-and-select line subsystem architecture (202), the add/drop subsystem 206 can be configured with other types of line subsystem architectures instead, such as a route-and-select architecture. Because all channels pass through a single EDFA 222 in the directionless switch module 218 before being routed to the line degree modules 210, the architecture shown in FIG. 2 may provide blocking functionality.

The example architectures of add/drop subsystems described herein (e.g., CD and CDC), are provided for illustrative purposes only. Additional add/drop subsystem architectures, such as architectures based on M×N WSS for directionless switching and multiplexing, may be employed in lieu of the example architectures described herein. Additionally, although CD functionality has been described in the context of a broadcast-and-select line subsystem architectures, and CDC functionality has been described in the context of a route-and-select line subsystem architectures, either type of line subsystem architectures can be employed together with any of a number of types of add/drop subsystem architectures. Although various example embodiments herein are described in the context of a route-and-select line degree subsystem and a LPC CDC MCS-based add/drop subsystem, this is for illustrative purposes only and should not be construed as limiting the scope of the present invention. Additionally, other combinations of architectures and port sizes are contemplated and are within the scope of the various example embodiments described herein.

Figure 3:
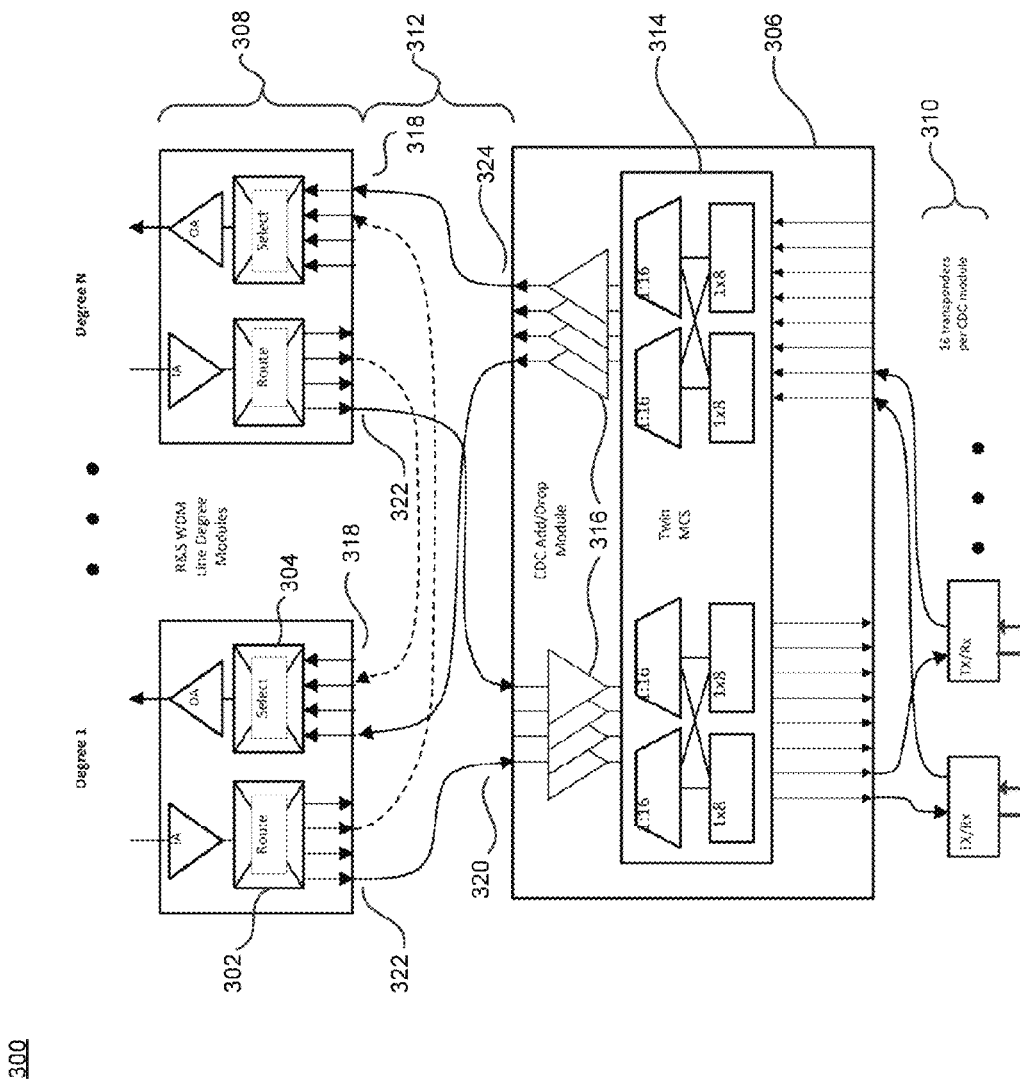
FIG. 3 shows an example ROADM that employs a route-and-select architecture, in accordance with an example embodiment described herein.

Having described the example ROADMs 100 and 200, reference will now be made to FIG. 3 to illustrate an example ROADM 300 that employs an alternative line degree subsystem architecture and an alternative add/drop subsystem architecture, in accordance with an example embodiment herein. As shown in FIG. 3, the ROADM 300 includes many of the same components (e.g., the line subsystem 302, intranodal fiber paths 312, add/drop subsystem 306, and local transponders 310) as those that were described above in connection with the ROADM 100 of FIG. 1 and/or the ROADM 200 of FIG. 2. Because the components that appear in both ROADM 100 and ROADM 300 are configured and function in a similar manner as described above in the context of FIG. 1, a complete description of the configuration and functionality of each component of FIG. 3 will not be repeated here.

One difference between the ROADM 100 and the ROADM 300 is that, whereas the line degree modules 104 of the ROADM 100 include a broadcast splitter 122 that broadcasts the WDM signal received from the network to the local add/drop subsystem 110 and to a line degree module 104 of each other degree of the ROADM 100, the example ROADM 300 instead employs a route WSS 302 that provides the WDM signal received from the network only to either the local add/drop module 306 or to a line degree module 104 of a select one of the other degrees of the ROADM 300. This type of line degree subsystem architecture is referred to as a route-and-select architecture, because of the routing and selecting functions performed by a route WSS 302 and a select WSS 304, respectively. Employing a route-and-select architecture can mitigate the loss and isolation challenges described above by using the route WSS 302 to steer each ingress wavelength only to the desired destination (e.g., an egress degree or a local transponder). Eliminating unused wavelengths at a select WSS 304 removes the leakage of extraneous channels because interfering wavelengths are simply not present at the select WSS 304. In terms of loss, the route-and-select ROADM 300 has a fixed loss (typically 12-16 dB) from a pair of WSSs (i.e., the route WSS 302 and the select WSS 304) regardless of the number of degrees. In this way, a high degree count route-and-select WSS can be employed to serve many flexible add/drop structures with no deleterious reduction in node OSNR.

Which particular add/drop subsystem architecture is employed in a ROADM may depend, at least in part, on desired functionality. For instance, variable bandwidth channels may necessitate colorless add/drop functionality. Along with colorless add/drop functionality, colorless and directionless (CD) add/drop functionalities may be desired to improve the usability of high cost transponders. Additionally, colorless, directionless, and contentionless (CDC) add/drop structures have non-blocking benefits. Each type of functionality may be a factor in determining which add/drop subsystem architecture to employ.

Another difference between the ROADM 100 and the ROADM 300 is that, whereas the ROADM 100 employs an AWG architecture add/drop subsystem 110, the add/drop subsystem employed in the ROADM 200 is a non-blocking colorless, directionless, and contentionless (CDC) module

306. Since the CDC add/drop module 306 functions in a known manner to route signals between the local add/drop transponders 310 and the line degree subsystem 308, a complete description of its functionality is not provided herein.

For convenience, only a pair of route-and-select line degree modules 308 is shown in FIG. 3, along with the CDC add/drop module 306 and a pair of transponders 310; a complete illustration of the modules (306, 308, and 310) and the fiber interconnections therebetween (e.g., made by way of intranodal fiber paths 312) is not provided in FIG. 3. In addition, each of the line degree modules 308 and the CDC add/drop module 306 are shown as having only four input ports (e.g., input ports 318 of each one of the line degree modules 308, and input ports 320 of the CDC add/drop module 306) and four output ports (e.g., output ports 322 of each one of the line degree module 308, and output port 324 of the CDC add/drop module 306) (each port being coupled to a corresponding one of the intranodal fiber paths 312) between the line degree modules 308 and the CDC add/drop module 306. In some cases, however, there may be additional (e.g., twenty) ports on the line degree modules 308 and additional (e.g., eight) ports on the CDC add/drop module 306. The CDC add/drop module 306 includes multiple 16×8 multicast switches (MCSs) 314, each of which connects 16 local transponders 310 with up to 8 route-and-select WDM line degree modules 308. In the add direction, outputs of the 16 local transponders 310 are switched and combined by the MCS 314. A CDC add/drop module 306 of this size may have high optical loss and so an erbium-doped fiber amplifier (EDFA) array 316 may be added to the CDC add/drop module 306 to overcome the loss and meet minimum optical power requirements of the line subsystem 308.

A CDC add/drop module such as the module 306, which includes the 16×8 MCS 314 and the EDFA array 316, may be expensive and may suffer from degraded performance due to its high loss. A low port count (LPC) CDC add/drop module based on an 8×6 MCS can support 8 line degree modules and 6 local transponders but has low loss which may eliminate the need for an EDFA array, which, in turn, may reduce the cost of the CDC add/drop module and boost its optical performance. One drawback, however, associated with an architecture employing a LPC CDC add/drop module is the lower number of adds/drops that can be supported on the LPC CDC module (e.g., 6 instead of 16).

As can be appreciated in view of the above descriptions of the ROADMS 100, 200, and 300 of FIGS. 1, 2, and 3, respectively, there are numerous architecture options for implementing a ROADM (e.g., broadcast-and-select, route-and-select, two-tiered CD add/drop modules, CDC add/drop modules, LPC CDC add/drop modules, etc.). Which architectures are used for a particular ROADM can depend on the particular needs of that node, which may change requiring reconfiguration of the ROADM interconnections (e.g., the intranodal fiber paths 112, 204, or 312 described above in the contexts of FIG. 1, 2, or 3, respectively). As mentioned above, managing the reconfiguration of such ROADM interconnections can be complex and prone to error.

Figure 4:
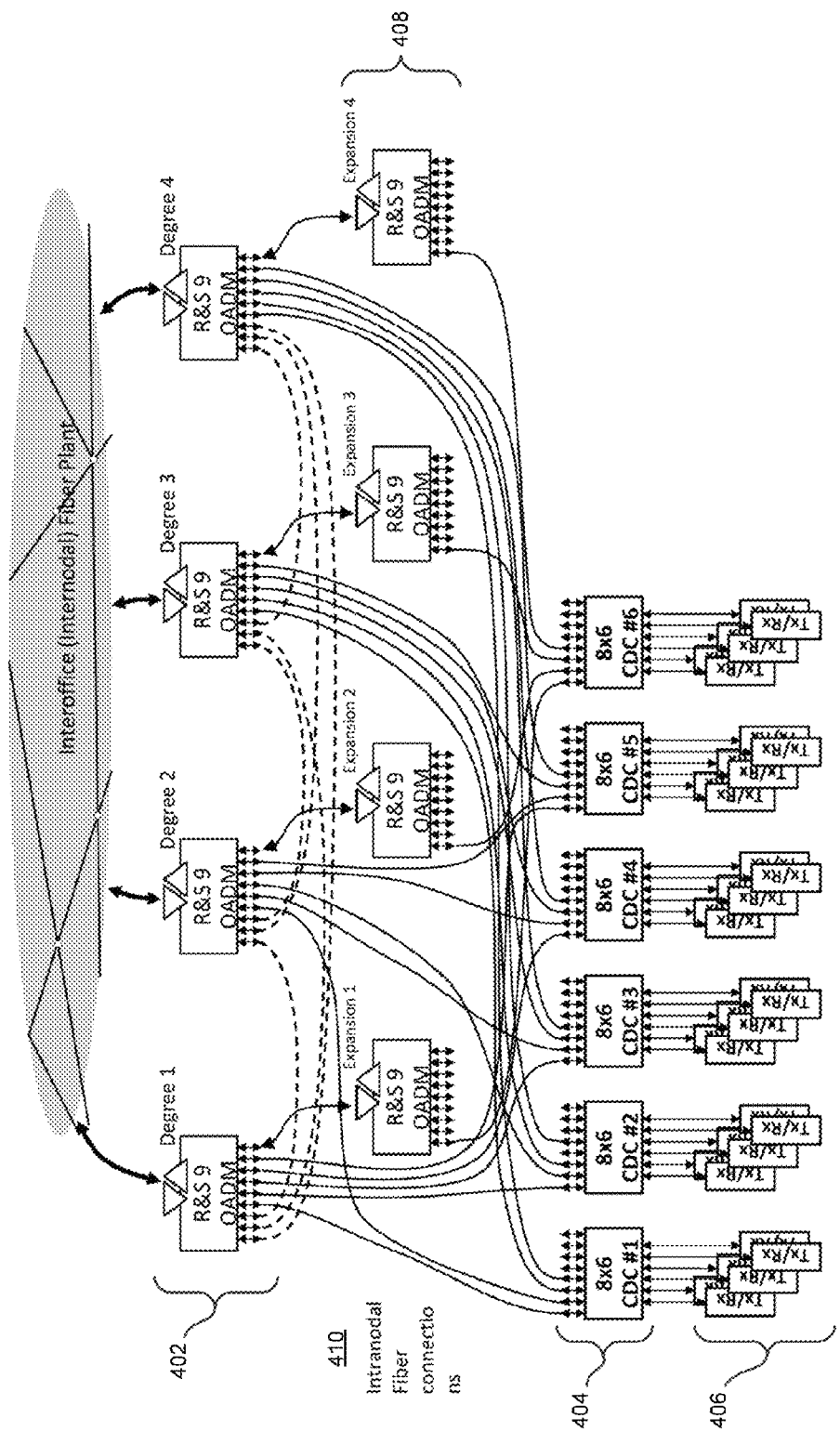
FIG. 4 shows an example architecture of a ROADM that employs multiple route-and-select line degree modules and LPC CDC add/drop modules, in accordance with an example embodiment herein.

To illustrate an example of such interconnections, reference will now be made to FIG. 4, which shows an example architecture of a ROADM 400 that employs multiple route-and-select line degree modules 402 and LPC CDC add/drop modules 404 based on 8×6 MCSs (MCSs not explicitly shown in FIG. 4). As shown in FIG. 4, the ROADM 400 includes many of the same components (e.g., the line degree subsystem 402, intranodal fiber paths 410, add/drop subsystem 404, and local transponders 406) as those that were described above in connection with the ROADMs 100, 200, and/or 300 of FIGS. 1, 2, and/or 3, respectively. Because the components that appear in both ROADM 400 and ones of the ROADMs 100, 200, and/or 300 are configured and function in a similar manner as described above in the context of FIGS. 1, 2 and/or 3, a complete description of the configuration and functionality of each component of FIG. 4 will not be repeated here.

In one example embodiment, the input and output ports of the line degree modules 402, the add/drop modules 404, and the local transponders 406 of the ROADM 400 of FIG. 4 generally correspond to (and are interconnected in much the same way as) the input and output ports of the line degree modules 104, the add/drop modules 110, and the local transponders 108 of the ROADM 100 of FIG. 1, although different numbers of inputs and outputs are shown in FIGS. 1 and 4. Accordingly, a description of how the input and output ports of the line degree modules 402, the add/drop modules 404, and the local transponders 406 of the ROADM 400 are interconnected, which is apparent from FIG. 4, is not provided here.

Additionally, since each LPC CDC add/drop module 404 supports fewer local transponders 406 (6 local transponders, in this example), and since it may be desirable that at least one port of each line degree module 402 be coupled (e.g., via an optical fiber) to a port of each CDC add/drop module 404, there may be a need to expand ports on the line degree modules 402 so that the total number of local transponders 406 (e.g., 36 local transponders (6 per CDC add/drop module 404), in this example) can be supported overall. Thus, shown in FIG. 4 are expansion route-and-select line degree modules 408 that subtend the route-and-select line degree modules 402. In the example of FIG. 4, there is one expansion module 408 for each degree. This approach effectively expands the number of ports of each line degree module 402, thereby enabling the line degree modules 402 to accommodate a greater number of CDC add/drop modules 404 and local transponders 406. Further description of an expansion scheme is provided below in the context of FIG. 10 and FIG. 11. Although FIG. 4 shows only one port of each line degree module 402 as being coupled to a port of a corresponding one of the CDC add/drop modules 404 by way of a corresponding one of the expansion line degree modules 408, in some cases, a greater number of ports of the line degree modules 402 can be coupled to a greater number of ports of the CDC add/drop modules 404 by way of additional expansion line degree modules (not shown in FIG. 4). For example, two ports from each line degree module 402 can be coupled via optical fibers to two expansion modules (408) per degree.

Each fiber path (e.g., each of the intranodal fiber connections 410) is shown in FIG. 4 as being bidirectional. Accordingly, each fiber path shown in FIG. 4 may be realized with, for example, a fiber pair. Additionally, the 9-port line degree modules 402, in practice, may scale to 20 or more ports resulting in many hundreds of fiber jumpers between modules. Thus, as illustrated in FIG. 4, it is clear that management of individual fiber cables (i.e., intranodal fiber connections 410) between each of the ports of the modules 402, 404, 408 can be complex, especially in cases where ROADM configuration changes are frequently desired due to continuously evolving needs. Installation and maintenance of these fibers can also be operationally difficult and prone to error.

Using fiber ribbon cables (each of which includes multiple, e.g., 12, fibers) to establish intranodal fiber paths can reduce the number of cables. Such ribbon cables typically are terminated by a single multiple-fiber push-on/pull-off (MPO) connector at each end that contains all 12 terminating fibers. In some cases, each MPO connector (or any other connector and/or termination described herein) includes at least one ingress fiber and at least one egress fiber, thus providing bidirectional (or symmetrical) connectivity between endpoints. However, as shown in FIG. 4, the intranodal fiber paths are meshed in that fibers from a single module are routed to a variety of other modules. Therefore, although coupling MPO-to-MPO ribbon cables directly between ROADM modules would decrease the complexity of managing the intranodal fiber paths, such an approach would not enable the mesh topology often required of intranodal ROADM paths.

Described herein are various example embodiments that provide an apparatus for managing intranodal fiber paths that optically couple ROADM components (e.g., line degree modules, expansion modules, and/or CDC modules). In one example embodiment, the apparatus includes an additional piece of equipment (sometimes referred to herein as a "fiber shuffle") that replaces the intranodal fiber paths 112, 204, 312, and/or 410 described above in the contexts of FIGS. 1, 2, 3, and/or 4, respectively, and that is operable to shuffle optical fibers that provide meshed optical paths between the input and output ports of ROADM components. The fiber shuffle allows for direct MPO connections to the ROADM components and includes internal fiber routing of individual fibers from its connectors to other connectors within the shuffle. The MPO cables from each ROADM component are then cabled directly to the shuffle. The shuffle thus facilitates the establishment of individual fiber paths between various ROADM components, while greatly simplifying the management of intranodal fiber paths.

One feature of a ROADM node is that it can be configured to handle a variable number of degrees and a variable number of add/drop modules so that it can be sized for a particular application, which may be different for each node of a network and may change over time. For instance, at one particular node 4 line degrees modules and 6 CDC add/drop modules may be needed, whereas another node may require 6 line degree modules and 4 CDC add/drop modules. Also, a node may initially be configured with 2 line degree modules and 2 CDC add/drop modules, and in the future may be expanded to include an increased number of line degree modules and/or CDC add/drop modules. Thus, the various example embodiments herein provide a fiber shuffle that is sufficiently flexible to support a range of module numbers and types, and that includes ports that can be used for various module types. In this way, the fiber shuffle can facilitate different interconnect patterns between line degree modules, expansion line degree modules, and/or CDC add/drop modules (see, e.g., the various interconnect patterns between the components of FIG. 4).

Figure 5:
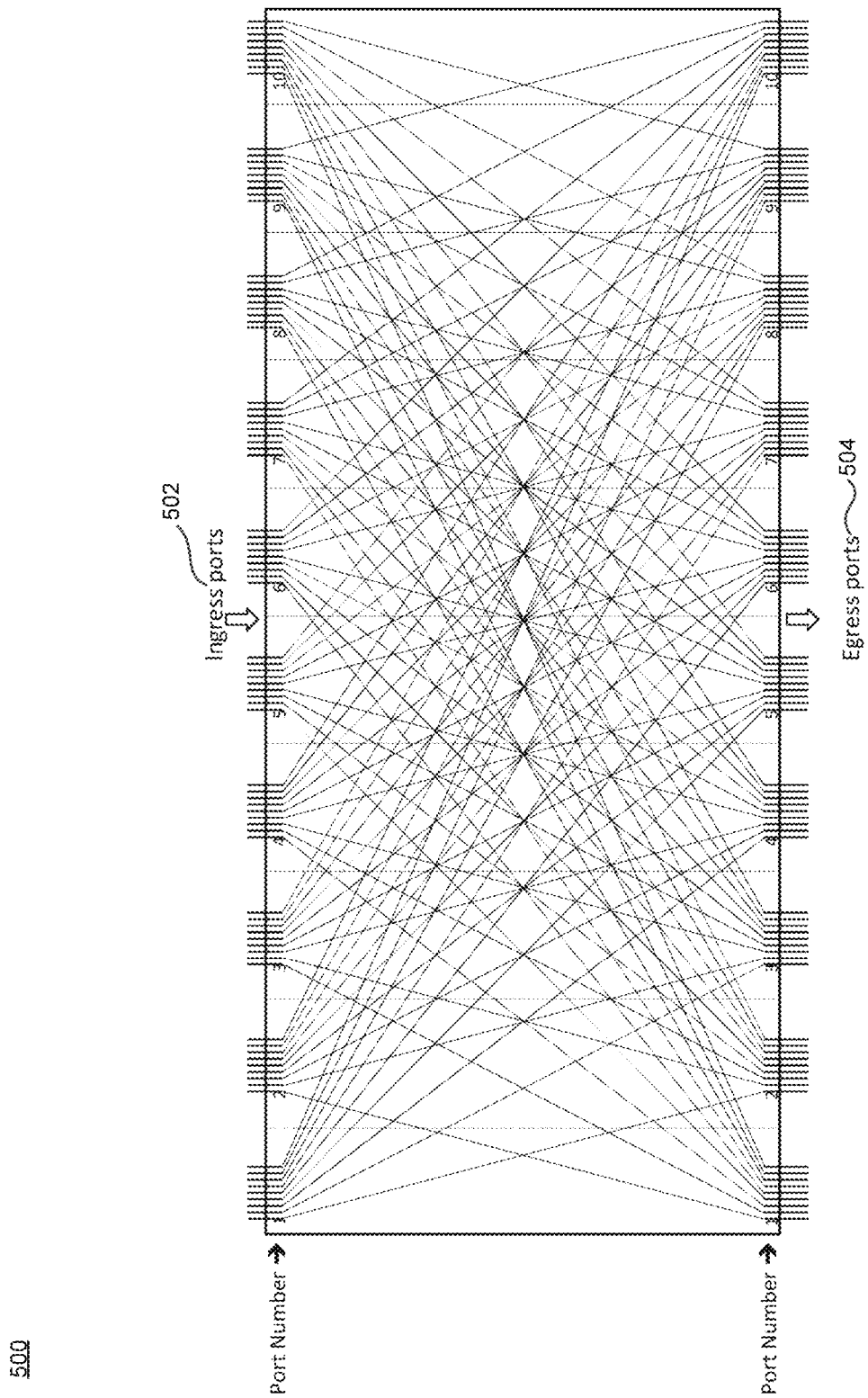
FIG. 5 shows further details of an example 10-port fiber shuffle, in accordance with an example embodiment herein.

Having described an example fiber shuffle in general terms, reference will now be made to FIG. 5 to describe an example 10-port fiber shuffle 500 in greater detail, in accordance with an example embodiment herein. The fiber shuffle 500 includes 10 bidirectional (or symmetrical) ports 502, 504 (numbered 1 to 10 in FIG. 5), each port comprising a multiple-fiber ingress port 502 a multiple-fiber egress port 504, which are shown in FIG. 5 as being vertically aligned. For instance, port 1 is comprised of a 9-fiber ingress port 1 (one of the 10 ingress ports 502) and a 9-fiber egress port 1 (one of the 10 egress ports 504).

In the example shuffle 500, each port (e.g., ingress ports 1 through 10, egress ports 1 through 10) includes a plurality (e.g., 9) of fibers. By way of a hardwired topology internal to the shuffle 500, the ports of the shuffle 500 are mutually meshed in that each port (e.g., port 1) is coupled to each other port (e.g., ports 2 through 10) by way of respective ones of the 9 fibers of the respective ports. For example, the 9 fibers of ingress port 1 are coupled to respective fibers of egress ports 2 through 10. For example, the 9 fibers of egress port 1 are coupled to respective fibers of ingress ports 2 through 10. In this way, by way of the internal topology of the shuffle 500, a signal that is received at any one of the ingress ports 502 can be outputted by way of any one of the nine other egress ports 504.

As described above, in one example embodiment, the shuffle 500 can replace the intranodal fiber paths 112, 204, 312, and/or 410 described above in the contexts of FIGS. 1, 2, 3, and/or 4, respectively, and can shuffle optical fibers that provide meshed optical paths between the input and output ports of ROADM components. The fiber shuffle 500 also allows for direct MPO connections to ROADM components (not shown in FIG. 5) and includes internal fiber routing of individual fibers from its connectors to other connectors within the shuffle. The MPO cables from each ROADM component can then be cabled directly to the shuffle 500. The shuffle 500 thus facilitates the establishment of individual fiber paths between various ROADM components, while greatly simplifying the management of intranodal fiber paths.

For instance, as will be described in further detail below, in one example embodiment the bidirectional shuffle ports 502, 504 can be cabled (external to the shuffle 500) to a single module in the system, be it a line degree module or CDC add/drop module (neither of which is shown in FIG. 5). In the case of a route-and-select line degree module, the ingress port 1 (502) at a top portion of the shuffle 500 can be connected to a route WSS port of the line degree module, and the egress port 1 (504) at a bottom portion of the shuffle 500 can be connected to a select WSS port of the line degree module.

Additionally, as described in further detail below in connection with FIGS. 13 through 19, the topology of the shuffle 500 may be modularized (e.g., broken down into discrete modular components) to increase the ease and flexibility of manufacturing the shuffle 500 and reconfiguring a ROADM that employs the shuffle 500.

Having described an example shuffle 500, reference will now be made to FIG. 6 to describe an example front panel of a 10-port shuffle 600. The shuffle 600 is similar to the shuffle 500 described above in the context of FIG. 5, except that, whereas the shuffle 500 has 9 fibers per ingress port and 9 fibers per egress port, the shuffle 600 has 12 fibers per ingress port and 12 fibers per egress port.

Figure 6:
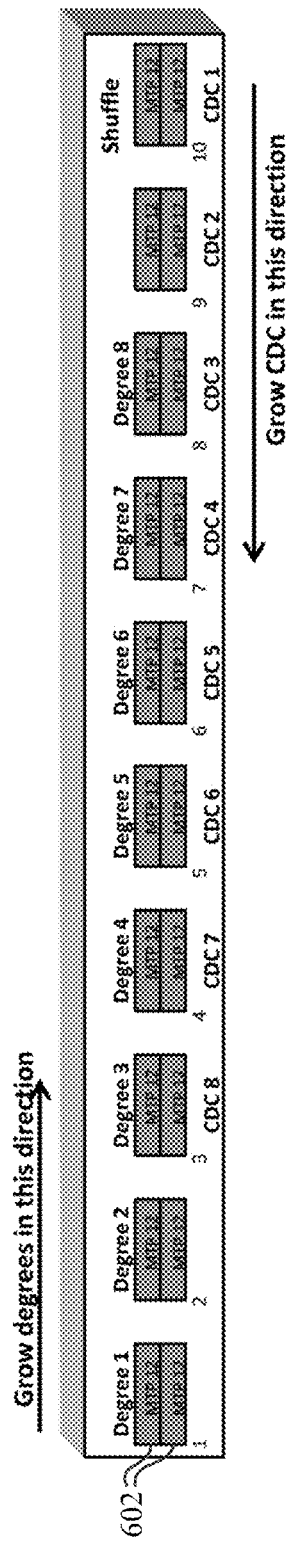
FIG. 6 shows an example labeling scheme for the ports of a 10-port shuffle, in accordance with an example embodiment herein.

FIG. 6 shows an example 10-port shuffle 600 where each port is comprised of a pair of 12-fiber MPO connectors 602 (e.g., one MPO connector 602 for each ingress port and one MPO connector 602 for each egress port, positioned below its corresponding ingress port) and each port is labeled. According to the port labeling shown in the example shuffle 600 of FIG. 6, the shuffle 600 can support up to 8 line degree modules and/or up to 8 CDC add/drop modules (such as the line degree modules 104, 210, 308, 402 and/or the modules of the add/drop subsystems 110, 206, 306, 404 described above in the contexts of FIGS. 1 through 4). For simplicity of management, line degree modules can be connected to the ports of the shuffle 600 in a direction from left-to-right, for instance, beginning with port 1 and continuing on to the port 2, and so forth, up to a port corresponding to the total number of line degree modules (8 or less in this example). CDC add/drop modules can be connected to the ports of the shuffle 600 in a direction from right-to-left, for instance, beginning with port 10 and continuing on to port 9, and so forth, down to a port corresponding to the total number of CDC add/drop modules (8 or less in this example). It can be seen in the example shuffle 600 that port 3 through port 8 can be used for either line degree modules or CDC add/drop modules. In this way, the shuffle 600 can support from 1 to 8 line degree modules and from 1 to 8 CDC add/drop modules.

Figure 7:
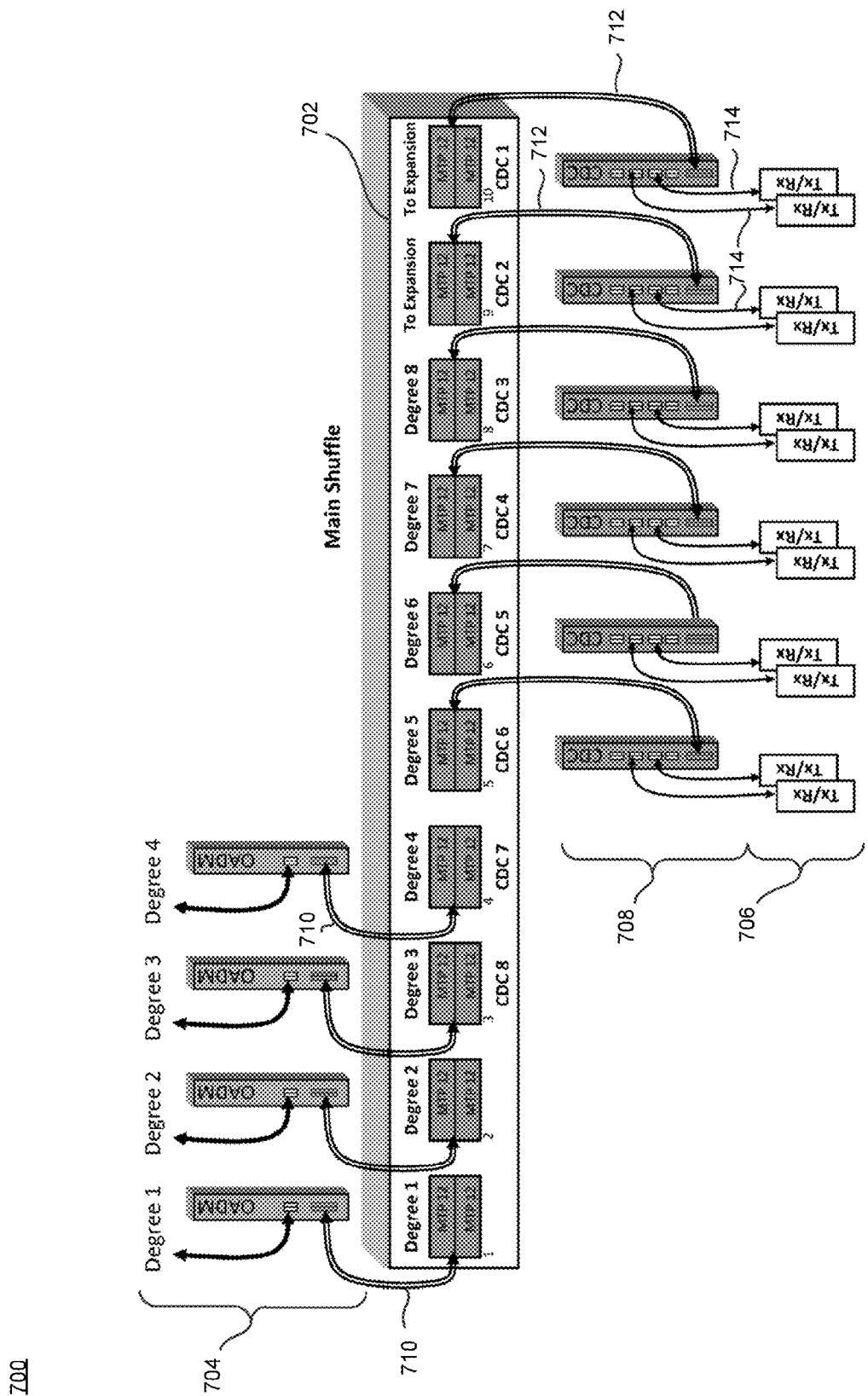
FIG. 7 illustrates an example manner by which components of an example ROADM system may be interconnected by way of a fiber shuffle, in accordance with an example embodiment herein.

Having described an example front patent of the shuffle 600, reference will now be made to FIG. 7 to describe how an example shuffle 702 can be interconnected to other ROADM components using fiber ribbon cables. As shown in FIG. 7, the ROADM 700 includes many of the same components (e.g., the line degree modules 704, add/drop modules 708, and local transponders 706) as those that were described above in connection with the ROADMs 100, 200, and/or 300 of FIGS. 1, 2, and/or 3, respectively. Because the components that appear in the ROADM 700 and in one or more of ROADMs 100, 200, and/or 300 are configured and function in a similar manner as described above in the context of FIGS. 1, 2, and/or 3, a complete description of the configuration and functionality of each component of FIG. 7 will not be repeated here.

FIG. 7 illustrates how components of an example ROADM system 700 may be interconnected by way of an example fiber shuffle 702 (e.g., in lieu of intranodal fiber paths 112, 204, 312, and/or 410 of FIGS. 1 through 4, respectively), in accordance with an example embodiment herein. In the example ROADM system 700, by way of multiple cables 710, 712, and 714 and a topology (not shown) internal to the shuffle 702, the 4 line degree modules 704 can be coupled to one another and to each of 6 local transponders 706 by way of corresponding ones of 6 CDC add/drop modules 708. In particular, cables 710 couple the line degree modules 704 to the shuffle 702; cables 712 couple the shuffle 702 to the add/drop modules 708; and cables 714 couple the add/drop modules 708 to the local transponders 706, as shown in FIG. 7. In one example embodiment, the cables 710 and 712, together with the shuffle 702, replace the intranodal fiber paths 112, 204, 312, and/or 410 described above in the contexts of FIGS. 1 through 4, respectively.

Having described how components of a ROADM may be interconnected to the shuffle 702, reference will now be made to FIG. 8 to describe how fibers of ROADM components may be coupled to fibers of other ROADM components via an internal shuffle topology.

Figure 8:
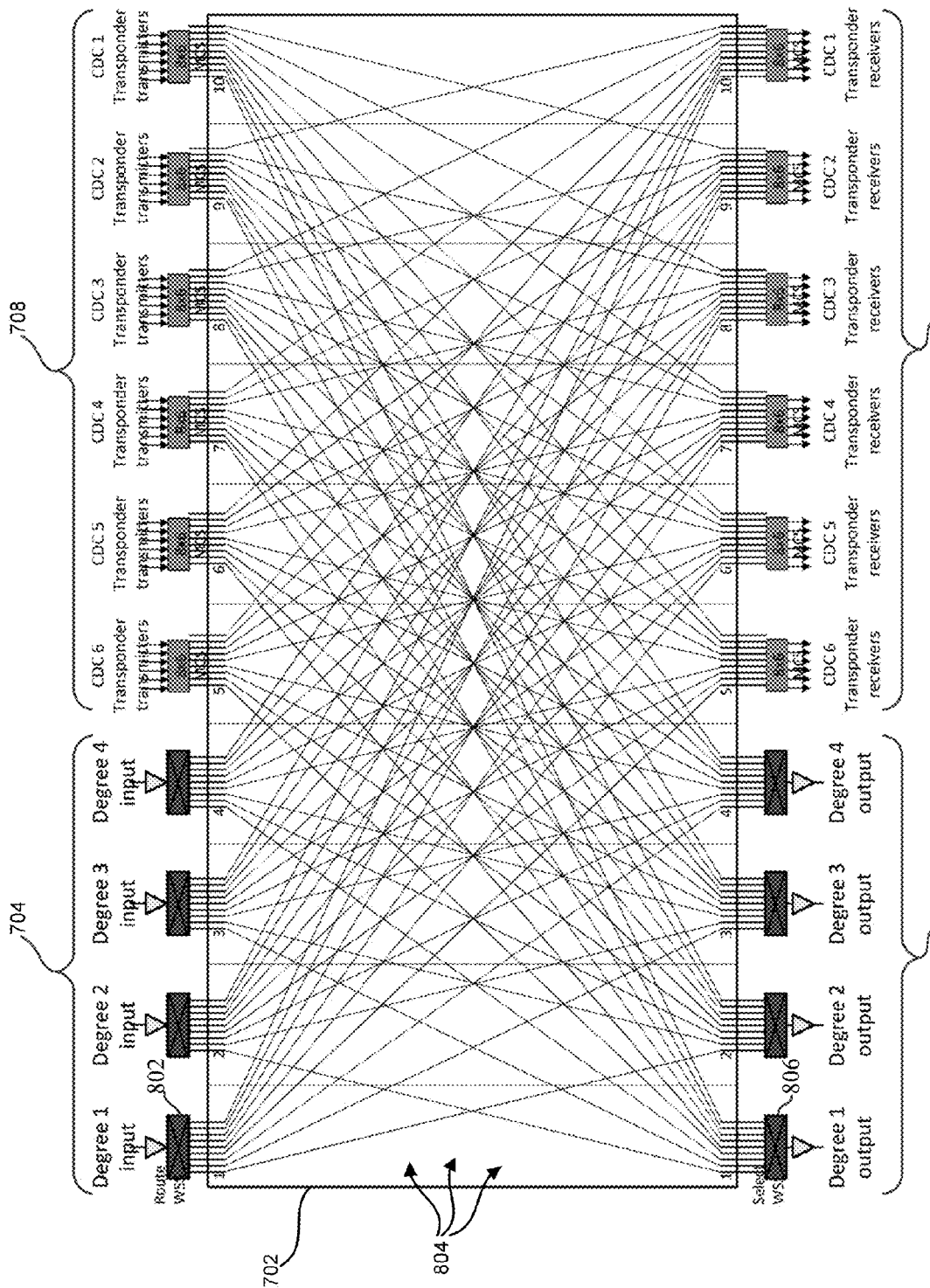
FIG. 8 shows an example topology of optical fibers that are internal to a fiber shuffle, in accordance with an example embodiment herein.

FIG. 8 shows an example topology (interconnection pattern) 804 of optical fibers that are internal to the example shuffle 702 described above in connection with FIG. 7. By way of the example topology 804 shown in FIG. 8, which is the same as topologies described in further detail above in the context of the shuffle 500 (FIG. 5), each of the 4 line degree modules 704 is coupled to each other one of the 4 line degree modules 704 (for routing express traffic) and also to each of the 6 CDC add/drop modules 708 (for routing local add traffic and local drop traffic).

Note that the route WSS 802 (e.g., which may be the route WSS 302 described above in the context of FIG. 3) of degree 1 is coupled to all egress ports of the shuffle 702 except for egress port 1 (i.e., egress ports 2 through 9) by way of ingress port 1 and optical fibers 804 that are internal to the shuffle 702. Degree 1 select WSS 806 (e.g., which may be the select WSS 304 described above in the context of FIG. 3) is coupled to all ingress ports of the shuffle 702 except for ingress port 1 (i.e., ingress ports 2 through 9) by way of egress port 1 and optical fibers 804 that are internal to the shuffle 702. Because in most cases there is no need for a particular degree (e.g., degree 1) to select channels that are received on that degree to be transmitted on the same degree, in the example topology shown in FIG. 8 ingress degree 1 and egress degree 1 are not coupled to one another by internal optical fibers 804. The flow of signals throughout the line degree modules 704 and the add/drop modules 708 by way of the shuffle 702 is similar to the flow of signals throughout the example ROADMs 100, 200, 300, and 400, and so is not repeated here.

The CDC add/drop modules 1 through 6 shown in FIG. 8 are similarly coupled to ports of the shuffle 702. Each CDC add/drop module (e.g., the CDC add/drop module 1) is coupled to a corresponding one of the bidirectional ports of the shuffle 702 (e.g., port 10, which is comprised of ingress port 10 and egress port 10). Transmit channels (i.e., adds) from local transponders (not explicitly shown in FIG. 8) are switched and combined within corresponding CDC add/drop modules (e.g., the CDC add/drop module 1), and are coupled to a corresponding one of the ingress ports of the shuffle 702 (e.g., one of ingress ports 1 through 9). The egress ports of the shuffle 702 (e.g., egress port 10) is connected back to that same CDC add/drop module (e.g., CDC add/drop module 1) for splitting, switching, and final handoff of an optical signal to the local transponder for reception. Note that only the first 8 fibers for each of the example 8×6 MCS-based CDC add/drop modules shown in FIG. 8 are connected to the port of the shuffle 702. By way of the example topology 804 of the shuffle 702 shown in FIG. 8, each of the CDC add/drop modules 1 through 6 is coupled to each of the line degree modules 1 through 4. Careful tracing of the optical paths 804 shown in the shuffle 702 confirms that as many as 8 line degree modules or as many as 8 CDC add/drop modules can be completely interconnected by way of the shuffle 702, following the growth pattern described above in the context of FIG. 6.

Although FIG. 8 has been described as having 4 degree modules 704, 6 add/drop modules 708 (and 6 local transponders (receiver/transmitter pairs)), this is by example only. As shown in the labeling of FIG. 7, multiple different configurations are possible for connecting ROADM components to the shuffle 702. To illustrate this, reference will now be made to FIG. 9, which shows the example shuffle 702 interconnected to 8 line degree modules 904 and 2 add/drop modules 906 (and local transponders).

Figure 9:
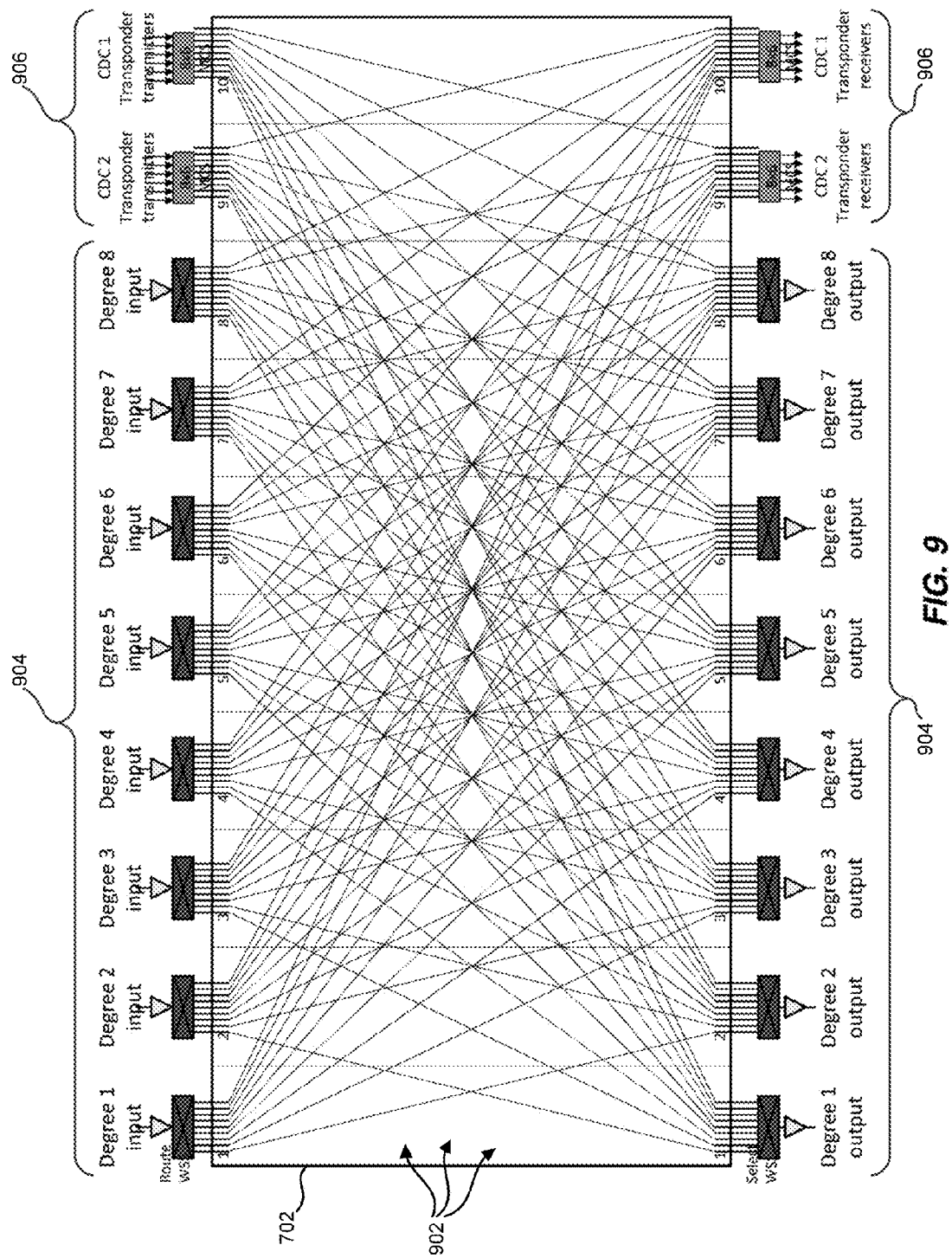
FIG. 9 shows another example topology of optical fibers that are internal to a fiber shuffle, in accordance with an example embodiment herein.

FIG. 9 shows an example topology 902 of optical fibers that are internal to the example shuffle 702 described above in connection with FIGS. 7 and 8. Whereas in the example of FIG. 7 the shuffle 702 is coupled to 4 line degree modules 704 and 6 CDC add/drop modules, in the example of FIG. 9 the shuffle 702 is coupled to 8 line degree modules 904 and 2 CDC add/drop modules 906. By way of the example topology 902 shown in FIG. 9, which is the same as topologies described in further detail above in the context of the shuffles 500 (FIG. 5) and 702 (FIG. 8), each of the 8 line degree modules 904 is coupled to each other one of the 8 line degree modules 904 (for routing express traffic) and also to each of the 2 CDC add/drop modules 906 (for routing local add traffic and local drop traffic).

Figure 10:
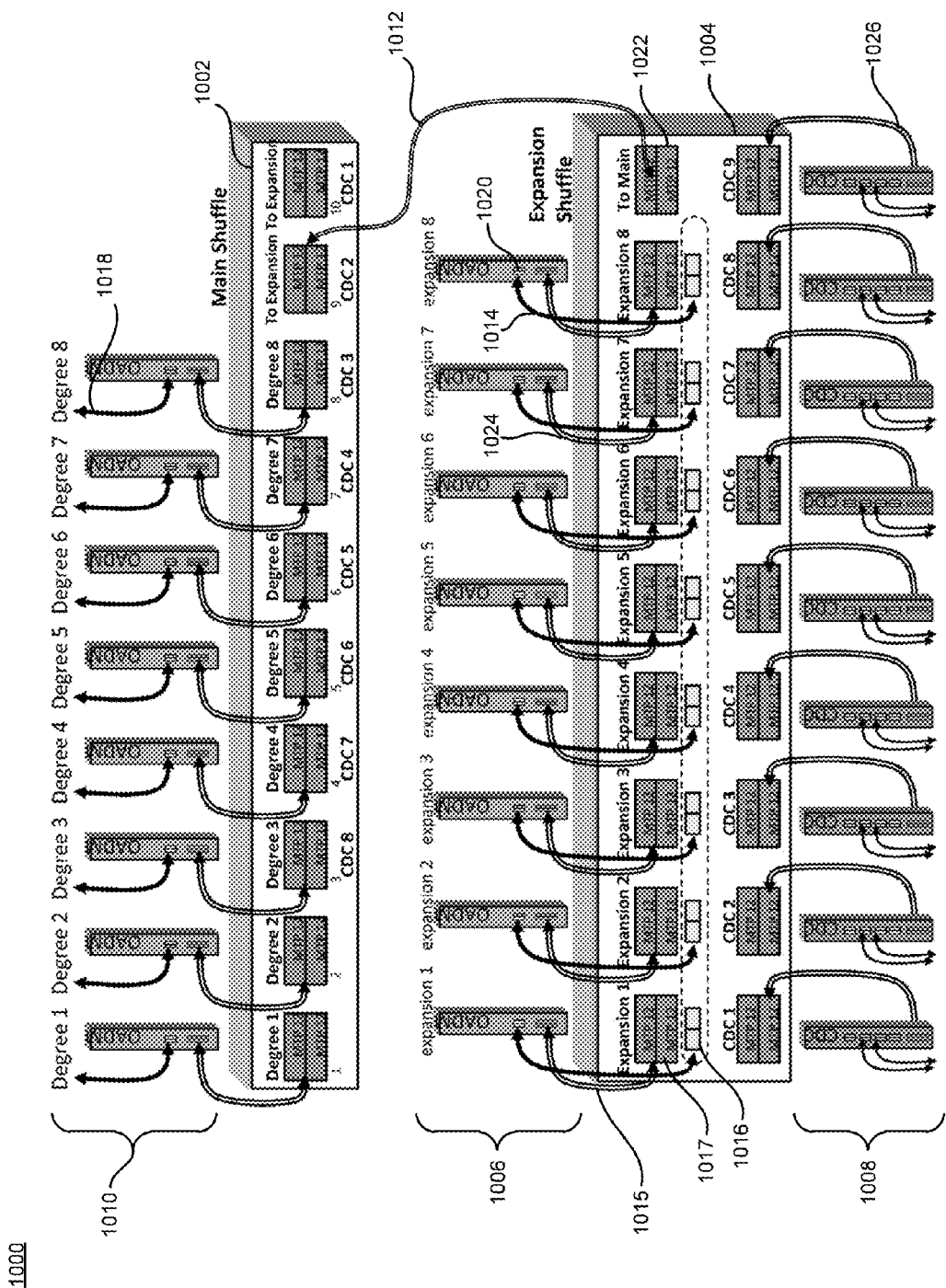
FIG. 10 shows an example ROADM node system that employs both a fiber shuffle and an expansion shuffle, in accordance with an example embodiment herein.

Having described example manners by which a fiber shuffle may couple ROADM components (e.g., line degree modules, add/drop modules, local transponders, etc.), reference will now be made to FIG. 10 to describe an example embodiment that employs an expansion shuffle to increase the number of ROADM components that a main shuffle can accommodate. FIG. 10 shows an example ROADM system 1000 that employs both a fiber shuffle 1002 (which may further represent the example shuffles 600 and/or 702 described above in the context of FIG. 6 through FIG. 9) and an expansion shuffle 1004 (also referred to herein as an "expansion fiber management apparatus"). Before a description of FIG. 10 is provided, a general description of expansion modules will be provided.

As mentioned above in the context of FIG. 4, in various example embodiments herein, expansion modules (e.g., expansion route-and-select line degree modules) are employed to expand the number of ports of each (non-expansion) line degree module of a ROADM, thereby enabling the (non-expansion) line degree modules to accommodate a greater number of CDC add/drop modules and/or local transponders. In one example, each expansion module is a line degree module (e.g., in addition to the non-expansion line degree modules of the ROADM) that functions in a manner similar to that of a non-expansion line degree module (e.g., element 308 described above in the context of FIG. 3). For example, each expansion module can contain a route-and-select WSS (such as elements 302 and 304 described above in the context of FIG. 3) and an EDFA (the input and output amplifiers shown in each module 308) to overcome the losses of the internal WSS. In some example embodiments, more than one expansion module can be allocated to each line degree module, thereby increasing the number of effective add/drop ports of the ROADM. Although various example embodiments are described herein in which expansion modules are coupled between line degree modules and CDC add/drop modules, this should not be construed as limiting. Other expansion architectures are contemplated, such as a multi-tiered expansion architecture, wherein a line degree module is coupled to CDC add/drop modules by way of two or more expansion modules that are connected to one another in a daisy chain.

Referring now to FIG. 10, the system 1000 includes many components similar to those describe above in the context of FIG. 7, and so the configuration and functionality of those components is not repeated here. However, the ROADM 1000 also includes an expansion shuffle 1004, expansion modules 1006, and cable 1012, which together, as described in further detail below, enable each of the 8 degree modules 1010 to be coupled to each of a plurality of local add/drop transponders (not shown in FIG. 10) by way of 9 add/drop modules 1008. In particular (as described in further detail below in the context of FIG. 11), each line degree module 1010 is coupled to each other line degree module 1010 by way of the internal topology of the main shuffle 1002. Each line degree module 1010 is also coupled to each add/drop module 1008 by way of a path including the internal topology of the main shuffle 1002, port 9 of the main shuffle 1002, cable 1012, port 1022 of the expansion shuffle 1004, jumpers 1016, cables 1014, expansion modules 1020, cables 1024, the internal topology of the expansion shuffle 1004, and cables 1026.

In some example embodiments, the main shuffle 1002 can be any one of the shuffles 600 or 702 described above in the context of FIG. 6 through FIG. 9. The expansion shuffle 1004 is an additional shuffle, distinct from the main shuffle 1002, that has been added to the system 1000 so as to couple line degree modules 1010 to subtended CDC modules 1008 by way of expansion modules 1006. Note that ports 9 and 10 of the main shuffle 1002 are shown with two labels indicating that those ports can be used in either of two ways. In this particular example, ports 9 and 10 of the main shuffle 1002 can be used either to couple the line degree modules 1010 to CDC add/drop modules (e.g., 1008) without an expansion shuffle interposed therebetween, or to couple the line degree modules 1010 to CDC add/drop modules 1008 by way of the expansion shuffle 1008, as now illustrated. The labeling of the main shuffle 1002 shown in FIG. 10 is provided as an example only, and is not limiting; other labeling schemes are contemplated. For instance, the expansion option on the main shuffle is not limited to ports 9 and 10. In other example embodiments, any of the ports 1 through 10 of the main shuffle 1002 can be used for expansion modules.

The main shuffle 1002 and expansion shuffle 1004 are coupled to one another in this example by way of a 12-fiber MPO cable 1012 interposed between port 9 of the main shuffle 1004 and a main port 1022 of the expansion shuffle 1004. The expansion modules 1006 are coupled to corresponding fiber jumper ports 1017 of the expansion shuffle 1004 by way of MPO cables 1015 in a manner similar to that by which the line degree modules 1010 are connected to the ports (Degree 1 through Degree 8) of the main shuffle 1002. One exception, however, is that while in the case of the line degree modules 1010 the line input and output fiber paths 1018 on the line 1010 degree modules are connected to an interoffice fiber plant (not shown in FIG. 10), the line input and output ports 1020 of the expansion modules 1006 are connected to a corresponding pair (one for each direction) of the expansion shuffle fiber jumper ports 1016.

As can be appreciated in view of the above description of FIG. 10, employing an expansion shuffle 1004 in conjunction with a main shuffle 1002 in the manner described can provide flexibility by enabling an increased number of ROADM components to be interconnected in a convenient manner. For instance, by using only one port (e.g., port 9) of the main shuffle 1002, together with the expansion shuffle 1004, line degree modules 1010 can be coupled to multiple ROADM components (e.g., the 9 add/drop modules 1026 shown in FIG. 10).

Figure 11:
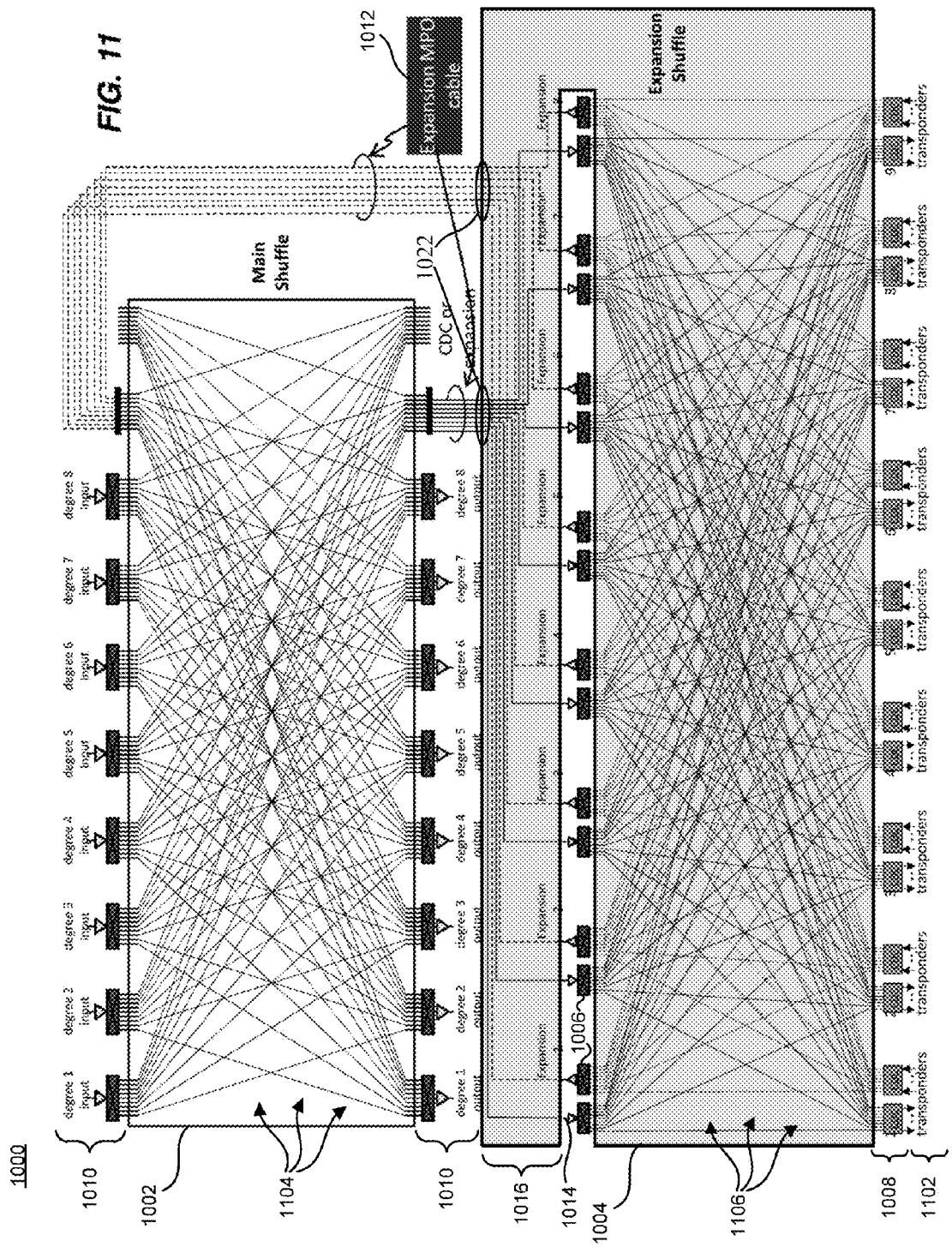
FIG. 11 illustrates further details of an example ROADM node system and the components thereof, in accordance with an example embodiment herein.

Having described an example system 1000 employing an expansion shuffle 1004, reference will now be made to FIG. 11 to describe further details of system 1000 and the components thereof. The system 1000 includes 8 line degree modules 1010, 8 expansion modules 1006, 9 CDC add/drop modules 1008, and multiple local transponders 1102. The line degree modules 1010 are coupled to the main shuffle 1002 as described above in the context of FIG. 10. One of the ports (port 9 in this example) of the main shuffle 1002 is coupled via the multi-fiber ribbon cable 1012 to the main port 1022 of the expansion shuffle 1004. By way of the cable 1012 and the main port 1022, each of the 8 line degree modules 1010 is provided with an optical path to the line input and line output ports 1020 of the 8 expansion modules 1006. Each of the fibers of the cable 1012 is coupled to the expansion shuffle 1004 by way of the main port 1022, and from there is routed to the line input and output ports 1020 of the expansion modules 1006 by way of a fiber connector 1016 (e.g., mounted to a faceplate of the expansion shuffle 1004) and one of cables 1014. In another example embodiment, the MPO cable 1012 from the main shuffle 1002 is terminated with 12 dual-fiber connectors (not shown in FIG. 11), which are directly plugged into corresponding ones of the line input ports 1020 and/or line output ports 1020 of the expansion modules 1006. The expansion modules 1006 are coupled to the local transponders 1102 by way of the internal fiber topology 1106 of the expansion shuffle 1004 and respective ones of the CDC add/drop modules 1008. In various example embodiments herein, the internal topology 1106 of the expansion shuffle 1004 can be implemented by employing any one or a combination of one or more mesh topologies and/or one or more star topologies, which are described below in the context of FIGS. 13 through 19.

Although various example embodiments described herein include 9-port route-and-select degree modules (e.g., 308, 402, 408, 704, 904, 1006, 1010), this is by example only and should not be construed as limiting. Other example embodiments are contemplated that can be directly scaled to manage fiber paths in line degree modules having a higher port count. For example, 16-port (e.g., 16-fiber) line degree modules can be accommodated in a 17-port main shuffle with 16-fiber MPO cables per port, and the internal fiber topologies 1104 (in the main shuffle 1002) and 1106 (in the expansion shuffle 1004) shown in FIG. 11 can be scaled to accommodate such a higher port count implementation. If an 8-degree ROADM including such elements (e.g., 16-port line degree modules, a 17-port main shuffle) is arranged in a manner similar to that of the ROADMs described above (e.g., 500, 700, 1000), and 8×6 MCS-based CDC add/drop modules are employed, each of the CDC add/drop modules can be coupled to the 8 line degree modules of the ROADM by using only 8 of the 16 fibers in the 16-fiber MPO cable. In a case where greater than 8 degrees are required (e.g., 12 degrees), a larger MCS-based CDC add/drop module (e.g., a 12×6 MCS-based CDC add/drop module) can be employed to couple each of the CDC add/drop modules to each of the 12 line degree modules in the ROADM.

In the various example embodiments described thus far herein, ROADM components are meshed in that each line degree module of the ROADM is coupled by way of fibers to every other line degree module of the ROADM and to every other local transponder of the ROADM. In some example embodiments, however, there may be no need to couple every one of the CDC add/drop modules (or every one of the local transponders) to every one of the 12 line degree modules of the ROADM. In such a case, certain local transponder channels may be limited to being routed to a subset of the line degree modules in the ROADM, but this limitation may be acceptable from a network routing perspective. In such an example embodiment, LPC CDC add/drop module (e.g., an 8×6 CDC add/drop module) may be employed even in ROADM systems having a number of degrees that is larger than the maximum number that the LPC CDC add/drop module can accommodate fully (e.g., greater than 8 degree in this example).

Figure 12:
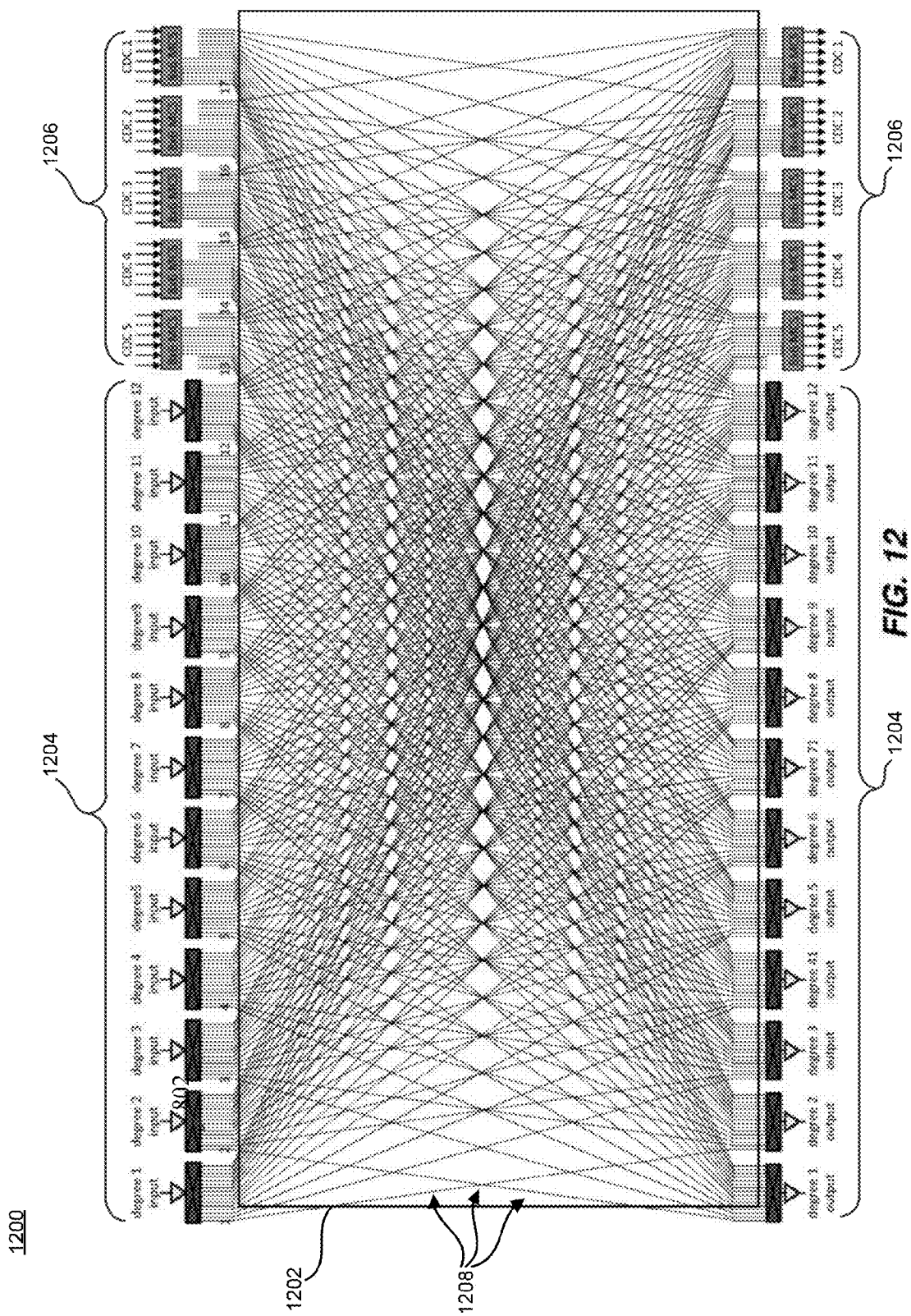
FIG. 12 shows an example ROADM system that includes a 17-port shuffle interposed between 12 line degree modules 5 CDC add/drop modules, in accordance with an example embodiment herein.

FIG. 12 shows an example ROADM system 1200 that includes a 17-port shuffle 1202 interposed between 12 line degree modules 1204 and 5 8×6 CDC add/drop modules 1206. By way of the topology 1208 internal to the shuffle 1202, every one of the 12 line degree modules 1204 is coupled to every one of the ports 13 through 17 of the shuffle. Thus, each of the CDC add/drop modules 1206 can (depending on which particular fibers of the ports 13 through 17 are used) be coupled to any of the 12 line degree modules 1204. However, because the 8×6 CDC add/drop modules 1206 have only 8 fibers available to be coupled to the shuffle 1202, in the example of FIG. 12, each of the CDC add/drop modules 1206 can (depending on which particular fibers of the ports 13 through 17 are used) only be coupled to a maximum of 8 of the 12 line degree modules 1204. In the example shown in FIG. 12, one of the CDC add/drop modules 1206 (CDC 1) is coupled to eight particular ones of the line degree modules 1204 (degrees 1 through 8), another of the CDC add/drop modules 1206 (CDC 2) is coupled to eight particular ones of the line degree modules (degrees 2 through 9), and so forth. In this manner, a single shuffle may be installed at a ROADM node, and the node may be configured by (1) employing LPC CDC add/drop modules, in which case fiber cables may be tailored to suit the needs of that particular node by coupling specific fibers of the LPC CDC add/drop modules to specific fibers of the shuffle, as needed, or (2) employing higher port-count CDC add/drop modules to provide complete interconnections between every CDC add/drop module and line degree module.

As mentioned above, various example topologies internal to fiber shuffles are possible, and which specific topology is used can depend on multiple factors, such as the specific needs of a particular node, which may evolve over time and warrant reconfiguration of shuffle topologies and/or other ROADM components. To simplify the configuration and reconfiguration of shuffle internal topologies, such topologies can be assembled, in accordance with various example embodiments herein, based on one or more subtopologies (e.g., mesh topologies and/or star topologies), as described in further detail below in connection with FIGS. 13 through 35.

In accordance with some of the example embodiments herein, industry-standard MPO multi-fiber terminations, which are available in specific numbers of fibers, are employed in a shuffle to couple line degree modules to CDC add/drop modules. Each MPO multi-fiber termination, in one example, includes at least one ingress fiber and at least one egress fiber, thus providing bidirectional (or symmetrical) connectivity between endpoints. Using the shuffle 500 shown in FIG. 5 as an example, it can be seen that the topology of the shuffle 500 is composed of multiple instances of two underlying interconnection patterns (also referred to herein as topologies), namely an N-way mesh topology and an M-way star topology, which will be described in further detail below. In some example embodiments herein, the internal topology of a shuffle is constructed from multiple instances of such mesh topologies and/or star topologies, each of which can be fabricated as an individual module and/or cable (e.g., a ribbon cable). In this manner, the internal topology of a shuffle can be simplified and/or grouped into subcomponents (e.g., one for each mesh topology and one for each star topology), which also can simplify the manufacturing of a shuffle and/or the scaling of a size of a shuffle to accommodate an increased number of internal fiber connections.

Figure 13:
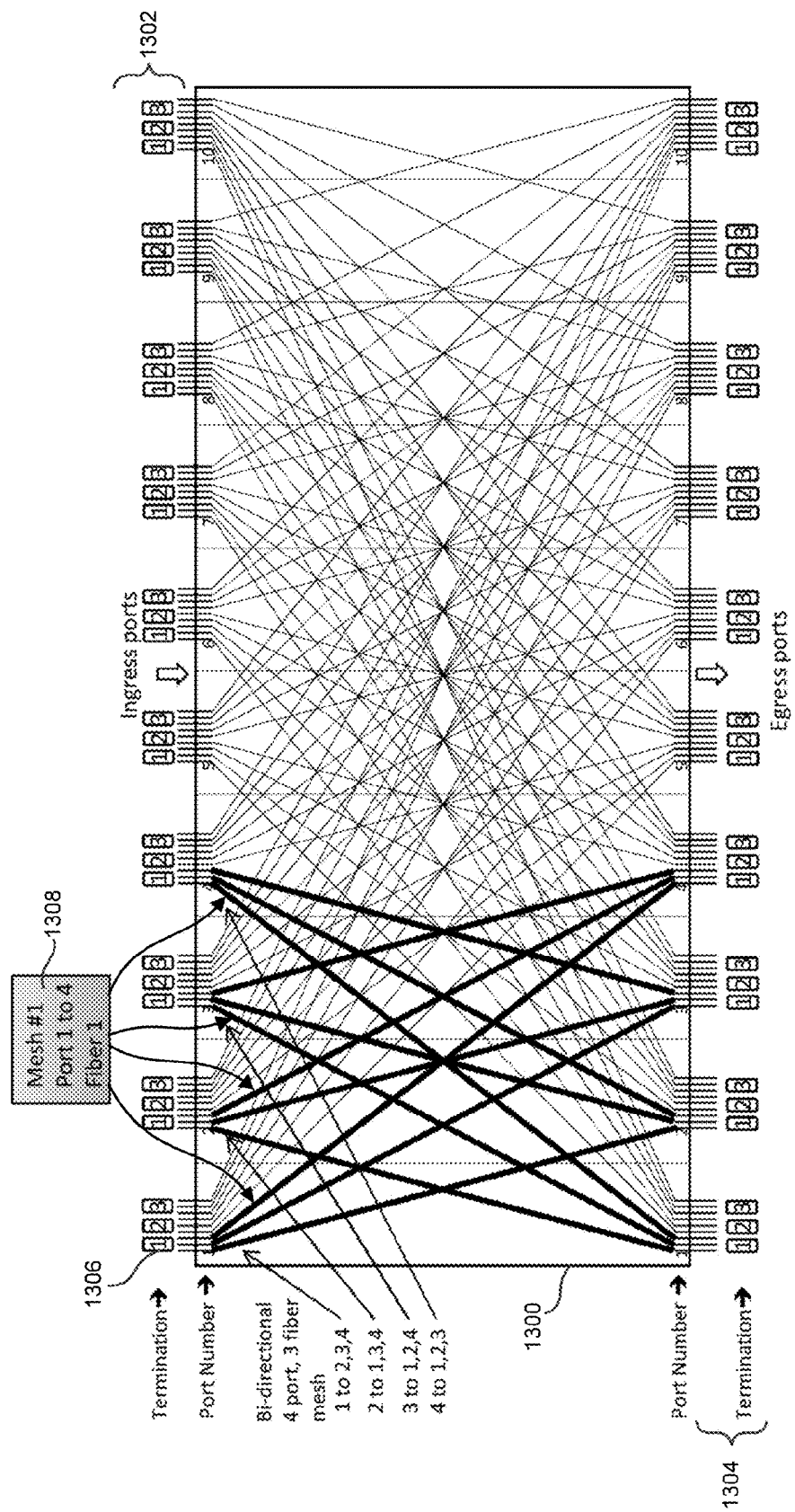
FIG. 13 shows an example 10-port shuffle wherein each of the ingress ports and each of the egress ports includes 3 MPO terminations, each having 6 fibers, in accordance with an example embodiment herein.

FIG. 13 shows an example 10-port shuffle 1300. Although not shown in FIG. 13, the shuffle 1300 can be coupled to other ROADM components (e.g., line degree modules, add/drop modules, local transponders, etc.) in manners similar to those described above in the contexts of FIG. 7 and/or FIG. 10. Each of the 10 ingress ports 1302 and each of the 10 egress ports 1304 of the shuffle 1300 includes 3 MPO terminations 1306, each MPO termination 1306 having a total of 6 fibers (3 ingress fibers for the ingress port 1302 and 3 egress fibers for the egress port 1304). Paths between ports 1 through 4 for termination 1 are set in bold to illustrate the four-way mesh topology 1308. The four-way mesh topology 1308 can be described as follows: (1) fiber 1 of ingress port 1, fiber 2 of ingress port 1, and fiber 3 of ingress port 1 are coupled to respective ones of fiber 1 of egress port 2, fiber 1 of egress port 3, and fiber 1 of egress port 4; (2) fiber 1 of ingress port 2, fiber 2 of ingress port 2, and fiber 3 of ingress port 2 are coupled to respective ones of fiber 1 of egress port 1, fiber 2 of egress port 3, and fiber 2 of egress port 4; (3) fiber 1 of ingress port 3, fiber 2 of ingress port 3, and fiber 3 of ingress port 3 are coupled to respective ones of fiber 2 of egress port 1, fiber 2 of egress port 2, and fiber 3 of egress port 4; and (4) fiber 1 of ingress port 4, fiber 2 of ingress port 4, and fiber 3 of ingress port 4 are coupled to respective ones of fiber 3 of egress port 1, fiber 3 of egress port 2, and fiber 3 of egress port 3. As can be seen in FIG. 13, in the four-way mesh topology 1308 there are no fibers that couple any single ingress port to that same egress port (e.g., no fibers of ingress port 1 are coupled to any fibers of egress port 1).

As can be seen from FIG. 13, the mesh topology 1308 is four-way in that it couples four ports (ports 1 through 4) to one another, and the mesh 1308 utilizes all three fibers of the first termination (termination 1) 1306. The mesh 1308 is provided by example only, and the number of ports that it couples and/or the number of fibers and/or terminations that is utilizes are not limited to those of this example. In some example embodiments, a mesh topology is provided that, based on the number of fibers (e.g., N fibers) included in each termination of a shuffle, can mutually couple N+1 ports to one another. In this example, the number of ports that a mesh topology can mutually couple to one another is based on the number of fibers included in each termination of the shuffle.

Although the mesh topology 1308 shown in FIG. 13 is a four-way mesh topology 1308, wherein each is provided by way of example only. Mesh topologies having different configurations (e.g., N-way mesh topologies, and/or) are contemplated.

Figure 14:
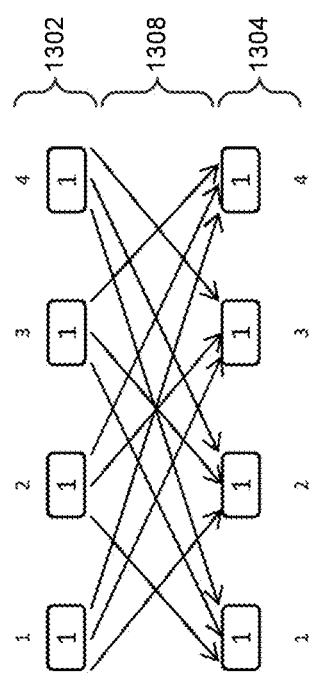
FIG. 14 shows a four-way mesh topology removed from a context of a shuffle, in accordance with an example embodiment herein.

To further illustrate the four-way mesh topology 1308 provided for port 1 through port 4 of the shuffle 1300, FIG. 14 shows the four-way mesh topology 1308 with other portions of the shuffle 1300 removed for clarity. As can be seen from FIG. 14, by way of the mesh topology 1308, each of ports 1 through 4 is coupled to each other one of ports 1 through 4. In particular, by way of the mesh topology 1308, ingress port 1 is coupled to egress ports 2 through 4, and egress port 1 is coupled to ingress ports 2 through 4; ingress port 2 is coupled to egress ports 1, 3, and 4, and egress port 2 is coupled to ingress ports 1, 3, and 4; ingress port 3 is coupled to egress ports 1, 2, and 4, and egress port 3 is coupled to ingress ports 1, 2, and 4; ingress port 4 is coupled to egress ports 1 through 3, and egress port 4 is coupled to ingress ports 1 through 3.

Figure 15:
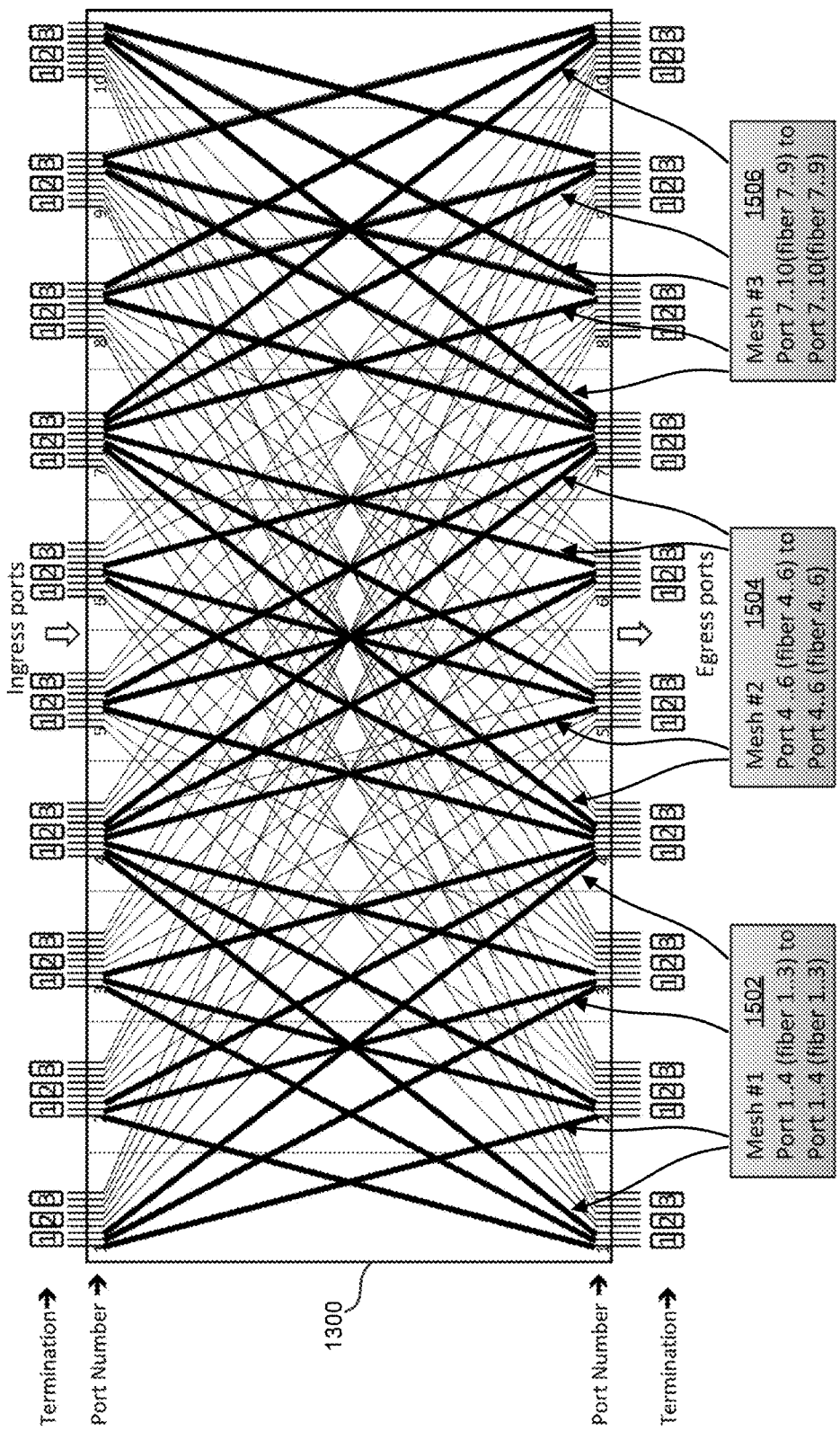
FIG. 15 shows an example 10-port shuffle that includes three instances of a four-way mesh topology, in accordance with an example embodiment herein.

Having described an example mesh subtopology, reference will now be made to FIG. 15, which shows that the example 10-port shuffle 1300 of FIG. 13 includes three instances of the four-way mesh topology 1308. For convenience, the three instances of the four-way mesh topology shown in FIG. 15 are labeled mesh 1502, mesh 1504, and mesh 1506. As described above in the context of mesh 1308, mesh 1502 (which may further represent mesh 1308) provides coupling for various ones of fiber 1, fiber 2, and fiber 3 of port 1, port 2, port 3, and port 4. In the same manner, mesh 1504 provides coupling for various ones of fiber 4, fiber 5, and fiber 6 of port 4, port 5, and port 6. Likewise, mesh 1506 provides coupling for various ones of fiber 7, fiber 8, and fiber 9 of port 7, port 8, port 9, and port 10.

Having described an example mesh topology that can be employed in a fiber shuffle, reference will now be made to FIG. 16, which illustrates a shuffle 1600 that is constructed based on an example bidirectional 6-way star topology 1602. The 6-way star topology 1602 can be described as follows: (1) fiber 4 of ingress port 1, fiber 5 of ingress port 1, and fiber 6 of ingress port 1 are coupled to respective ones of fiber 1 of egress port 5, fiber 1 of egress port 6, and fiber 1 of egress port 7; (2) fiber 4 of ingress port 2, fiber 5 of ingress port 2, and fiber 6 of ingress port 2 are coupled to respective ones of fiber 2 of egress port 5, fiber 2 of egress port 6, and fiber 2 of egress port 7; (3) fiber 4 of ingress port 3, fiber 5 of ingress port 3, and fiber 6 of ingress port 3 are coupled to respective ones of fiber 3 of egress port 5, fiber 3 of egress port 6, and fiber 3 of egress port 7; (4) fiber 1 of ingress port 5, fiber 2 of ingress port 5, and fiber 3 of ingress port 5 are coupled to respective ones of fiber 4 of egress port 1, fiber 4 of egress port 2, and fiber 4 of egress port 3; (5) fiber 1 of ingress port 6, fiber 2 of ingress port 6, and fiber 3 of ingress port 6 are coupled to respective ones of fiber 5 of egress port 1, fiber 5 of egress port 2, and fiber 5 of egress port 3; and (6) fiber 1 of ingress port 7, fiber 2 of ingress port 7, and fiber 3 of ingress port 7 are coupled to respective ones of fiber 6 of egress port 1, fiber 6 of egress port 2, and fiber 6 of egress port 3.

Figure 17:
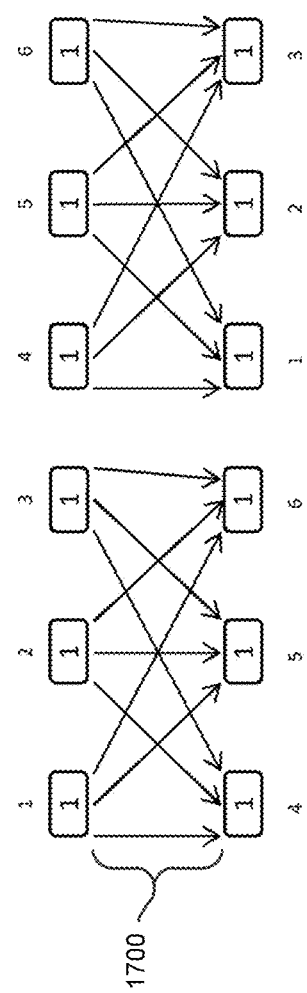
FIG. 17 shows an example 6-way star topology removed from a context of a shuffle, in accordance with an example embodiment herein.

To further illustrate a 6-way star topology (e.g., topology 1602 described above) that may be included in a fiber shuffle, FIG. 17 shows a 6-way star topology 1700 removed from a context of a shuffle for clarity. In this example, fiber 1 through fiber 3 of termination 1 through termination 3 are coupled to fiber 1 through fiber 3 of termination 4 through termination 6.

As can be seen from FIG. 17, a star topology (e.g., 1700) couples a set of N inputs (e.g., 6 inputs, in the example of FIG. 17) to a separate set of M outputs (6 outputs, in the example of FIG. 17), where N and M have the same number of ingress and egress fibers (6 ingress fibers and 6 egress fibers, in the example of FIG. 17).

Figure 16:
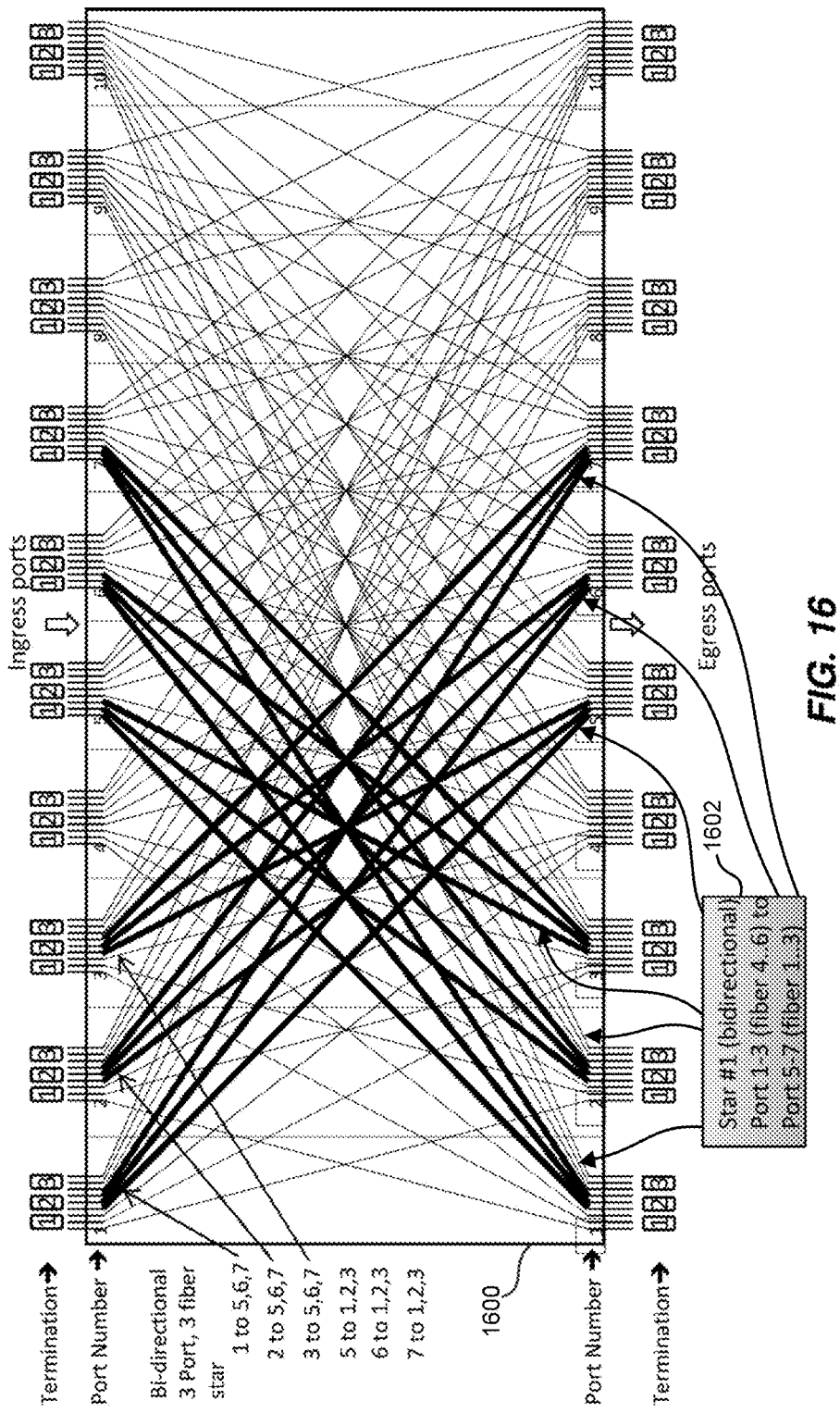
FIG. 16 illustrates an example shuffle constructed based on a bidirectional 6-way star topology, in accordance with an example embodiment herein.
Figure 18:
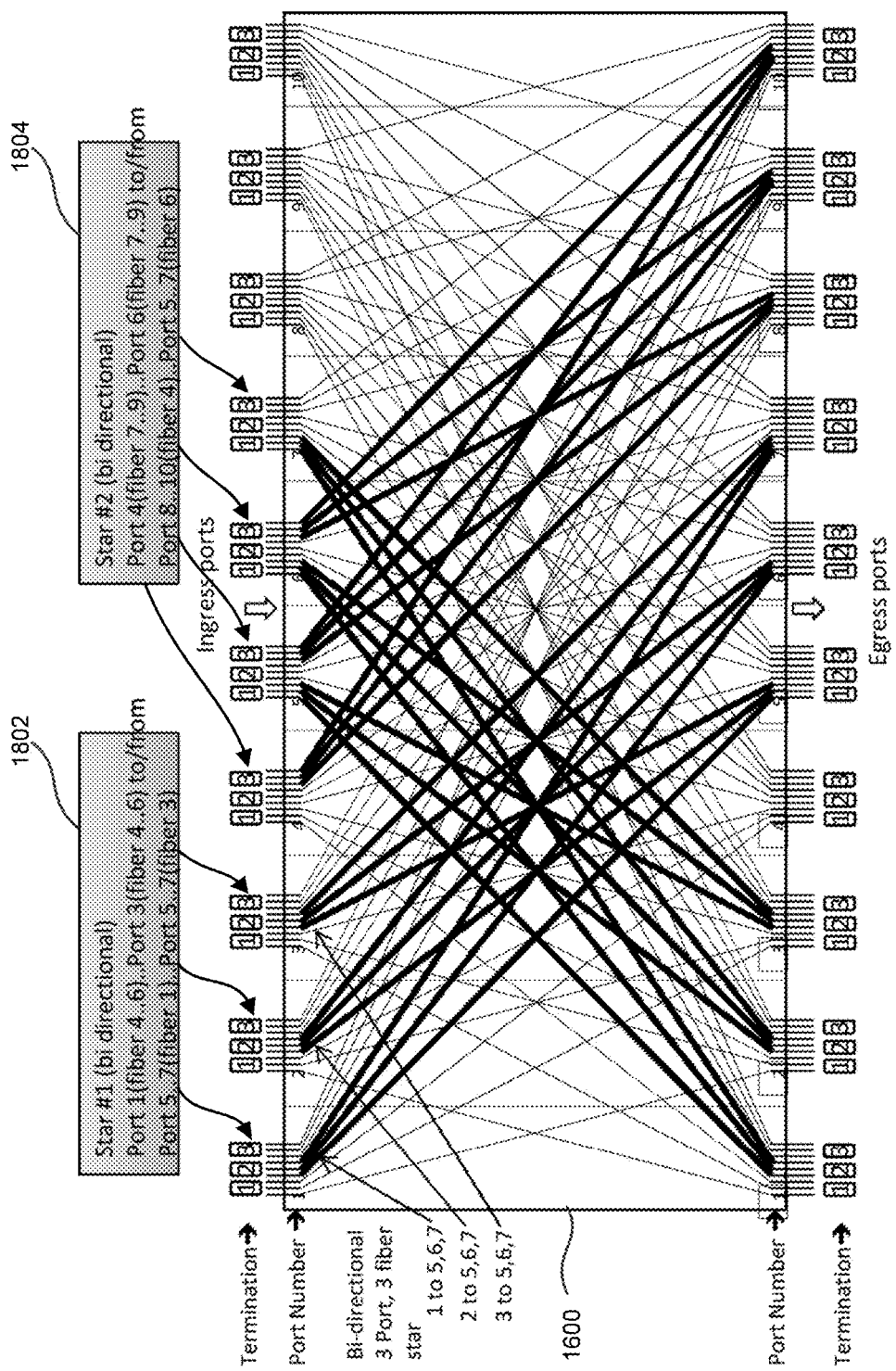
FIG. 18 shows an example 10-port shuffle including three instances of a 6-way star topology, in accordance with an example embodiment herein.
Figure 19:
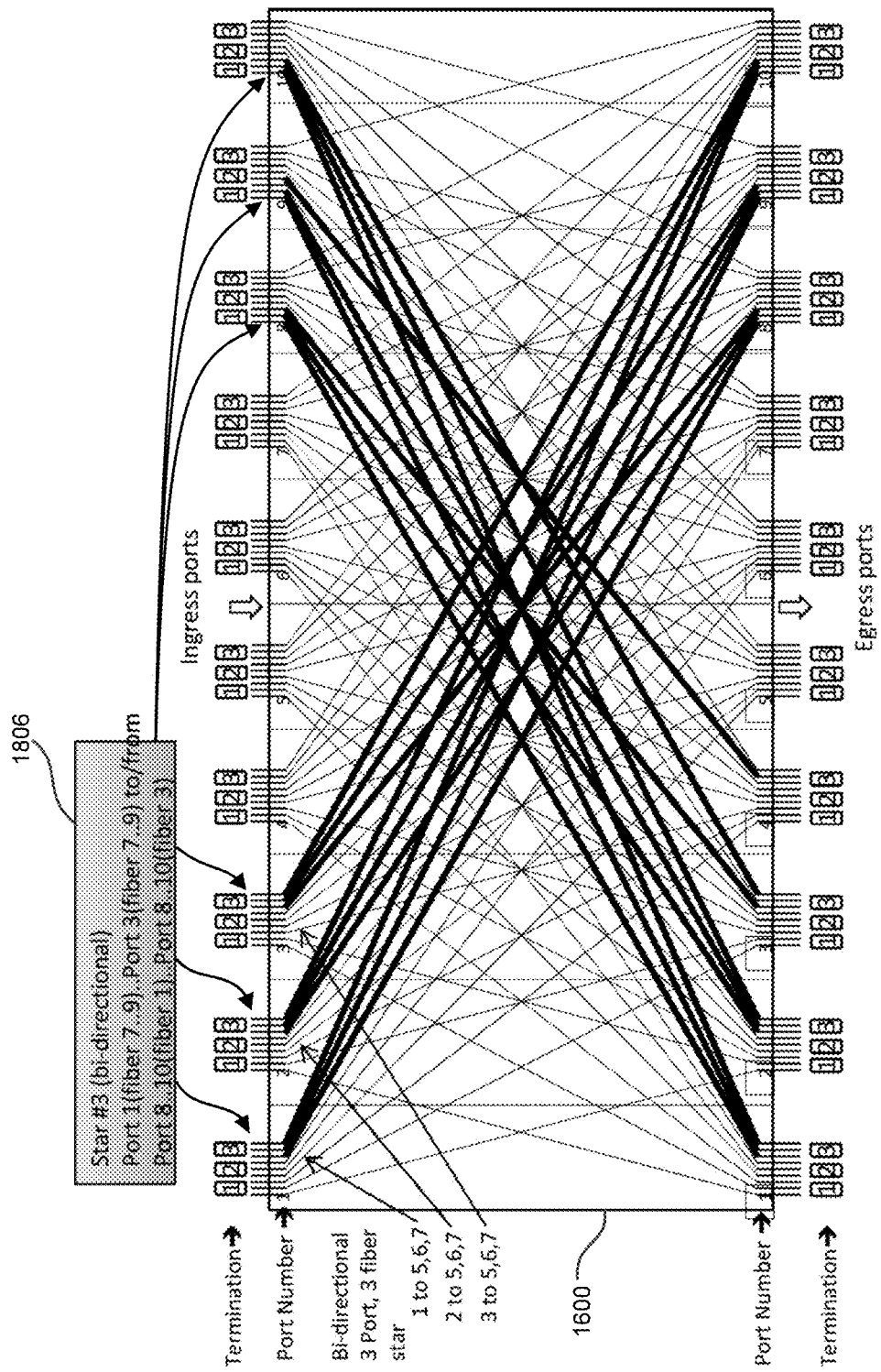
FIG. 19 shows an example 10-port shuffle including three instances of a 6-way star topology, in accordance with an example embodiment herein.

Together FIG. 18 and FIG. 19 show that the example 10-port shuffle 1600 of FIG. 16 includes three instances of the 6-way star topology 1602. For convenience, the three instances of the 6-way star topology shown in FIG. 18 and FIG. 19 are labeled star 1802, star 1804, and star 1806. As described above in the context of star 1602, star 1802 (which may further represent star 1602) provides coupling for various ones of fiber 4, fiber 5, and fiber 6 of port 1, port 2, and port 3, and fiber 1, fiber 2, and fiber 3 of port 5, port 6, and port 7. In a similar manner, star 1804 (only half of which is set in bold in FIG. 17) provides coupling for various ones of fiber 7, fiber 8, and fiber 9 of port 4, port 5, and port 6, and fiber 4, fiber 5, and fiber 6 of port 8, port 9, and port 10. Likewise, star 1806 (which is not set in bold in FIG. 17) provides coupling for various ones of fiber 7, fiber 8, and fiber 9 of port 4, port 5, and port 6, and fiber 4, fiber 5, and fiber 6 of port 8, port 9, and port 10.

As can be appreciated in view of the above description of FIGS. 13 through 19, in one example embodiment the entire 10-port shuffle 1300 can be defined in terms of 3 mesh topologies (i.e., mesh topology 1502, mesh topology 1504, and mesh topology 1506) and 3 star topologies (i.e., star topology 1802, star topology 1804, and star topology 1806). Additionally, each of the mesh topologies and/or the star topologies is fully independent. Thus, according to various example embodiments herein, the internal topology of a fiber shuffle can be constructed by incorporating these two types of topologies (the mesh topology and the star topology) only, in a modular fashion, thereby simplifying the manufacturing and management of such fiber shuffles.

Having described various example embodiments for shuffle topology modularization (e.g., by way of mesh subtopologies and/or star subtopologies), reference will now be made to FIGS. 20 through 35 to describe various example embodiments for front panel configurations that provide simplified management of intranodal fiber paths between ROADM components.

Figure 20:
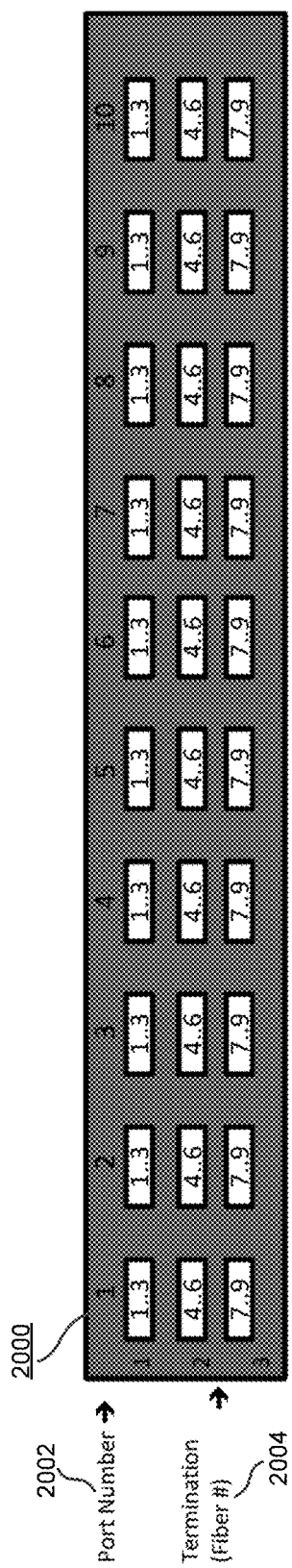
FIG. 20 shows an example 10-port shuffle, in accordance with an example embodiment herein.

By virtue of the independence between each of the mesh topologies and/or star topologies that can be combined in a fiber shuffle, the topologies employed in a fiber shuffle can be physical arranged in the shuffle so as to fit available rack space more readily. For example, FIG. 20 shows an example 10-port shuffle 2000 constructed such that each of the 10 ports 2002 includes 3 terminations 2004, with each of the terminations 2004 including 3 fiber pairs (3 pairs each of one ingress fiber and one egress fiber). For example, fiber pair 1 of termination 1 of port 1 includes one ingress fiber and one egress fiber. In some example embodiments herein, and as described in further detail below, the ports (and fibers thereof) 2002 shown in the example shuffle 2000 of FIG. 20 can correspond to the ports described above in the contexts of the example shuffles 500 (FIG. 5), 702 (FIGS. 8 and 9), 1002 (FIG. 10), 1300 (FIGS. 13 and 15), and/or 1600 (FIGS. 16, 18, and 19). Mesh subtopologies and/or star subtopologies can be mapped to ports of the front panel 2000 to provide simplified management of intranodal fiber paths between ROADM components, as described in further detail below.

Having described an example front panel arrangement of a shuffle 2000, reference will now be made to FIG. 21 to describe how sub-topologies can be mapped to the ports (and fibers thereof) of the front panel of the shuffle 2000, such that the entire topology 1300 shown in FIG. 15 may be realized using 3 mesh topologies (1502, 1504, 1506) and 3 star topologies (1802, 1804, 1806) described in connection with FIGS. 15, 18, and 19.

Figure 21:
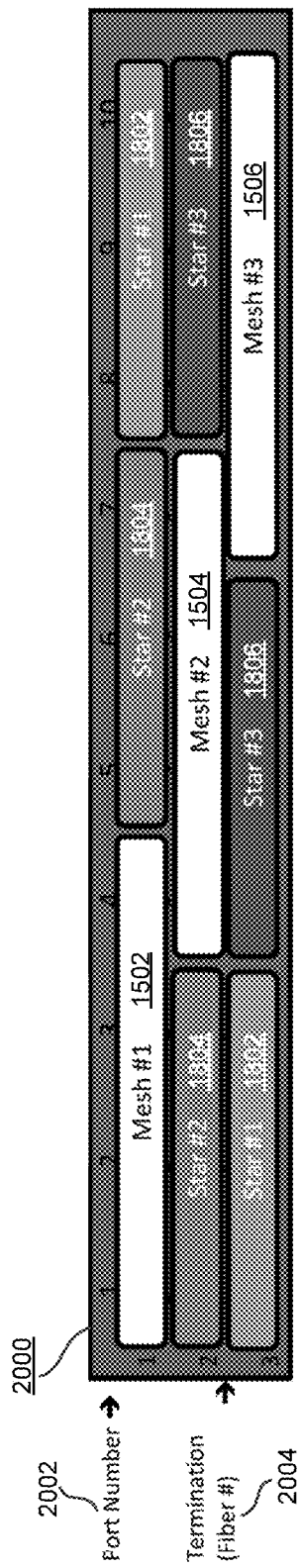
FIG. 21 illustrates an example arrangement by which three mesh topologies and three star topologies can mate with ports and terminations of a fiber shuffle, in accordance with an example embodiment herein.

FIG. 21 illustrates an example arrangement by which the three mesh topologies and the three star topologies can mate with the ports and terminations of the shuffle 2000. In particular, blocks corresponding to each of the three mesh topologies 1502, 1504 and 1506 and the three star topologies 1802, 1804, and 1806 are overlaid upon the ports 2002 and terminations 2004 illustrated in FIG. 20 to indicate the mating arrangement between the topologies and the ports and terminations of the shuffle 2000.

In particular, in the example front panel arrangement of the shuffle 2000, the fibers of the mesh subtopology 1502 are mapped to fibers 1 through 3 (i.e., termination 1) of ports 1 through 4; the fibers of the mesh subtopology 1504 are mapped to fibers 4 through 6 (i.e., termination 2) of ports 4 through 7; the fibers of the mesh subtopology 1506 are mapped to fibers 7 through 9 (i.e., termination 3) of ports 7 through 10; the fibers of the star subtopology 1802 are mapped to fibers 7 through 9 (i.e., termination 3) of ports 1 through 3 and to fibers 1 through 3 (i.e., termination 1) of ports 8 through 10; the fibers of the star subtopology 1804 are mapped to fibers 4 through 6 (i.e., termination 2) of ports 1 through 3 and to fibers 1 through 3 (i.e., termination 1) of ports 5 through 7; and the fibers of the star subtopology 1806 are mapped to fibers 7 through 9 (i.e., termination 3) of ports 4 through 6 and to fibers 4 through 6 (i.e., termination 2) of ports 8 through 10.

Figure 22:
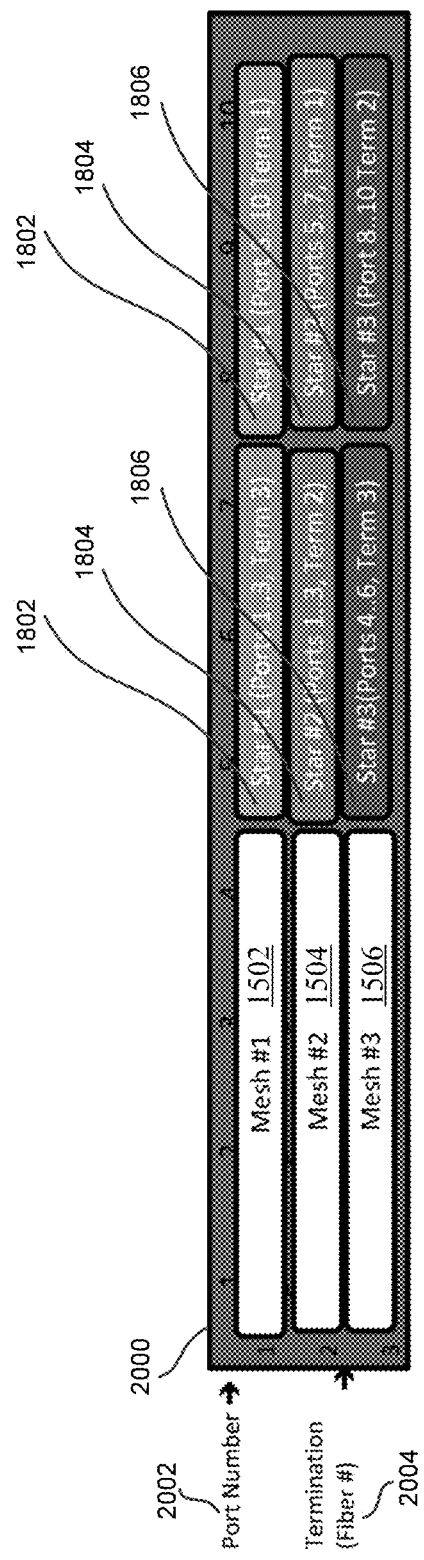
FIG. 22 illustrates another example arrangement by which three mesh topologies and three star topologies can mate with ports and terminations of a fiber shuffle, in accordance with an example embodiment herein.

FIG. 22 illustrates another alternative example embodiment for mapping 3 mesh subtopologies (1502, 1504, 1506) and 3 star topologies (1802, 1804, 1806) to the front panel of the shuffle 2000 to fully realize the entire shuffle topology 1300 shown in FIG. 13. In this example embodiment, each of the topologies (1502, 1504, 1506, 1802, 1804, and 1806) is constructed as a single hardware circuit card, ribbon cable, and/or the like, which enables each of the topologies to mate with a contiguous group of adjacent ones of the terminations 2004.

In particular, in the example front panel arrangement of the shuffle 2000, shown in FIG. 22, the fibers of the mesh subtopology 1502 are mapped to fibers 1 through 3 (i.e., termination 1) of ports 1 through 4; the fibers of the mesh subtopology 1504 are mapped to fibers 4 through 6 (i.e., termination 2) of ports 1 through 4; the fibers of the mesh subtopology 1506 are mapped to fibers 7 through 9 (i.e., termination 3) of ports 1 through 4; the fibers of the star subtopology 1802 are mapped to fibers 1 through 3 (i.e., termination 1) of ports 5 through 10; the fibers of the star subtopology 1804 are mapped to fibers 4 through 6 (i.e., termination 2) of ports 5 through 10; and the fibers of the star subtopology 1806 are mapped to fibers 7 through 9 (i.e., termination 3) of ports 5 through 10. Physically locating each of the topologies in a grouped block of terminations in a manner similar to that shown in FIG. 22 enables construction of the shuffle to be less complex and more modular, and also simplifies field replacement.

Figure 23:
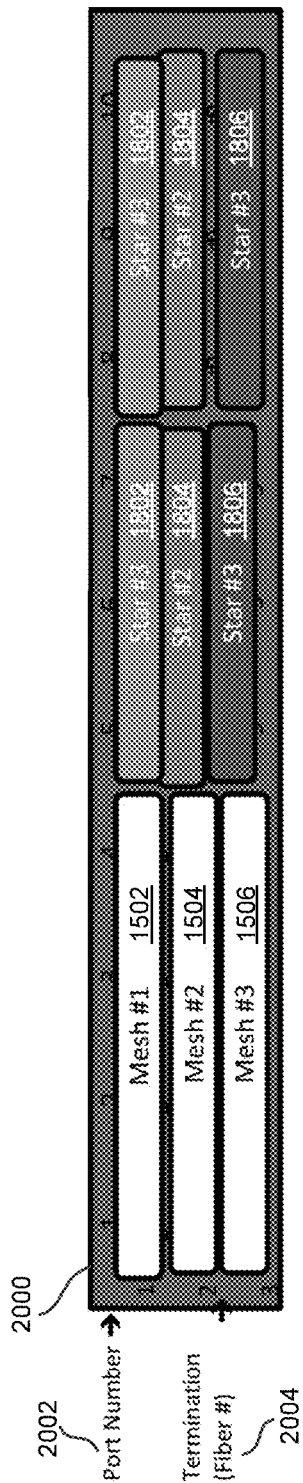
FIG. 23 illustrates yet another example arrangement by which three mesh topologies and three star topologies can mate with ports and terminations of a fiber shuffle, in accordance with an example embodiment herein.

FIG. 23 illustrates yet another example arrangement by which the three mesh topologies and the three star topologies can mate with the ports and terminations of the shuffle 2000. This arrangement provides co-location of the mesh and star topologies such that the 10-port shuffle 2000 can be built using separately installed rack components populated with the appropriate number of mesh and star topology modules to complete the optical topology of the shuffle 2000.

Figure 24:
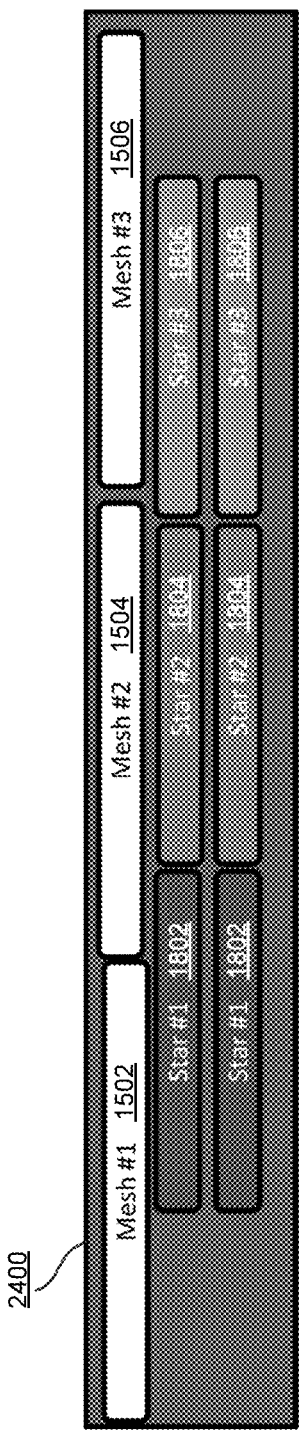
FIG. 24 shows a further arrangement by which three mesh topologies and three star topologies can mate with ports and terminations of a shuffle, in accordance with an example embodiment herein.

FIG. 24 shows a further arrangement by which the 3 mesh subtopologies (1502, 1504, 1506) and 3 star topologies (1802, 1804, 1806) can mate with the ports and terminations of a shuffle 2400 that includes a greater number of ports and/or terminations than the shuffle 2000 described above. In this way, the shuffle 2400 has room for expansion (e.g., by way of adding further mesh and/or star topologies to vacant space in the shuffle 2400) as needed.

Figure 25:
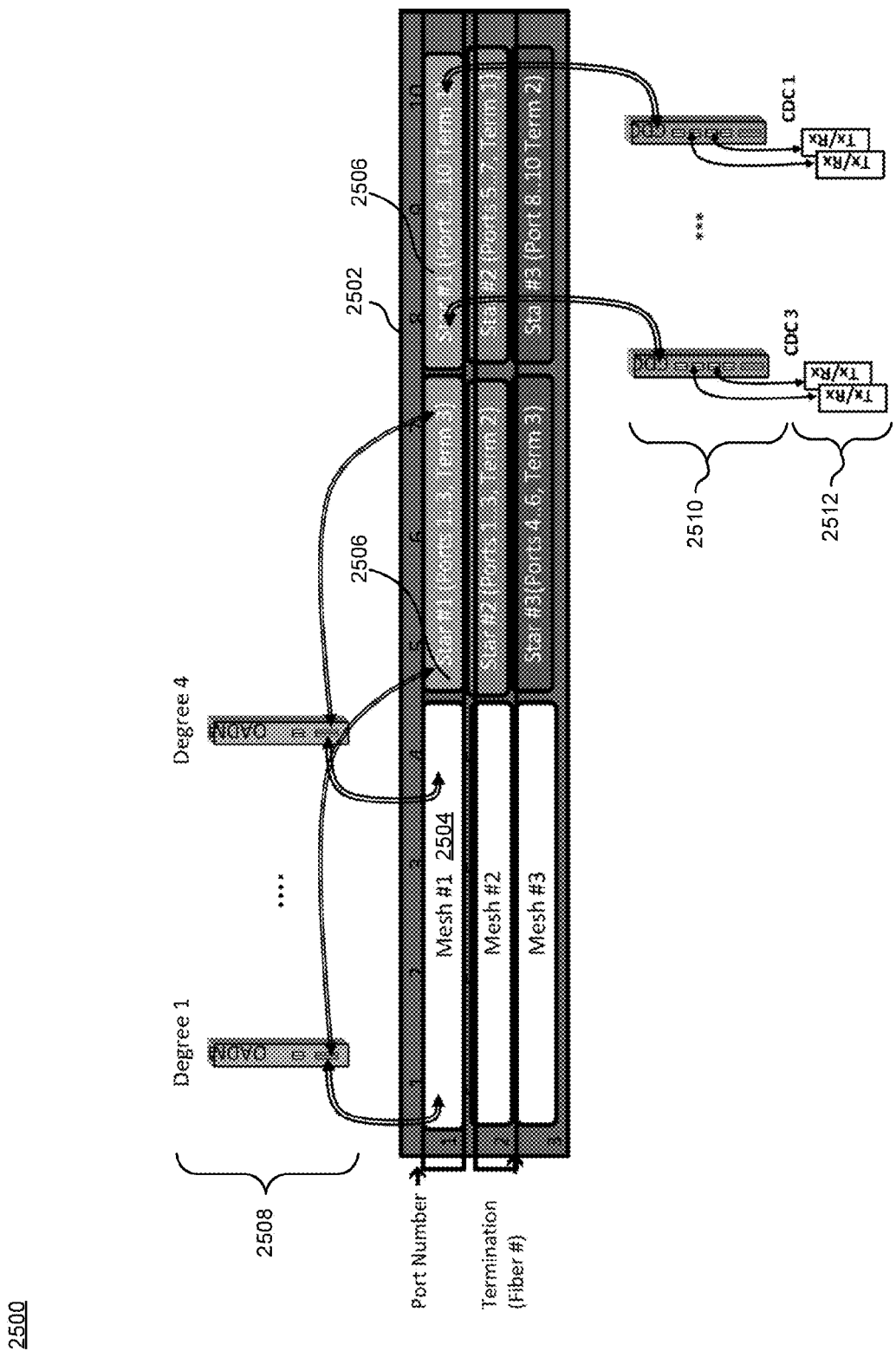
FIG. 25 illustrates how components of an example 4-degree ROADM system, including an example fiber shuffle, can be interconnected, in accordance with an example embodiment herein.

Having described example front panel arrangements of fiber shuffles, reference will now be made to FIG. 25 to describe how such a shuffle (e.g., shuffle 2000 having the front panel arrangement of FIG. 22) can be interconnected to other components of a ROADM (e.g., line degree modules, add/drop modules, local transponders, etc.). The ROADM components 2508, 2510, 2512, shown in FIG. 25 are interconnected by way of the shuffle 2502 in a manner similar to those described above in connection with other shuffles described in the various example embodiments provided herein. Accordingly, a full description of the interconnections, which are apparent from FIG. 25, is not provided here.

FIG. 25 illustrates how components of an example 4-degree ROADM system 2500, including an example fiber shuffle 2502, can be interconnected, in accordance with an example embodiment herein. This example utilizes one mesh topology 2504 and one star topology 2506. Each of the four line degree modules 2508 (e.g., OADMs) is coupled both to mesh topology 2504 and star topology 2506. CDC add/drop modules 2510 are interposed and coupled between the star topology 2506 and local transponders 2512. For example (as described above in the context of FIG. 19), the line degree modules 2508 can be coupled to port 1 through port 4 and the CDC add/drop modules 2510 can be coupled to port 5 through port 8.

Figure 26:
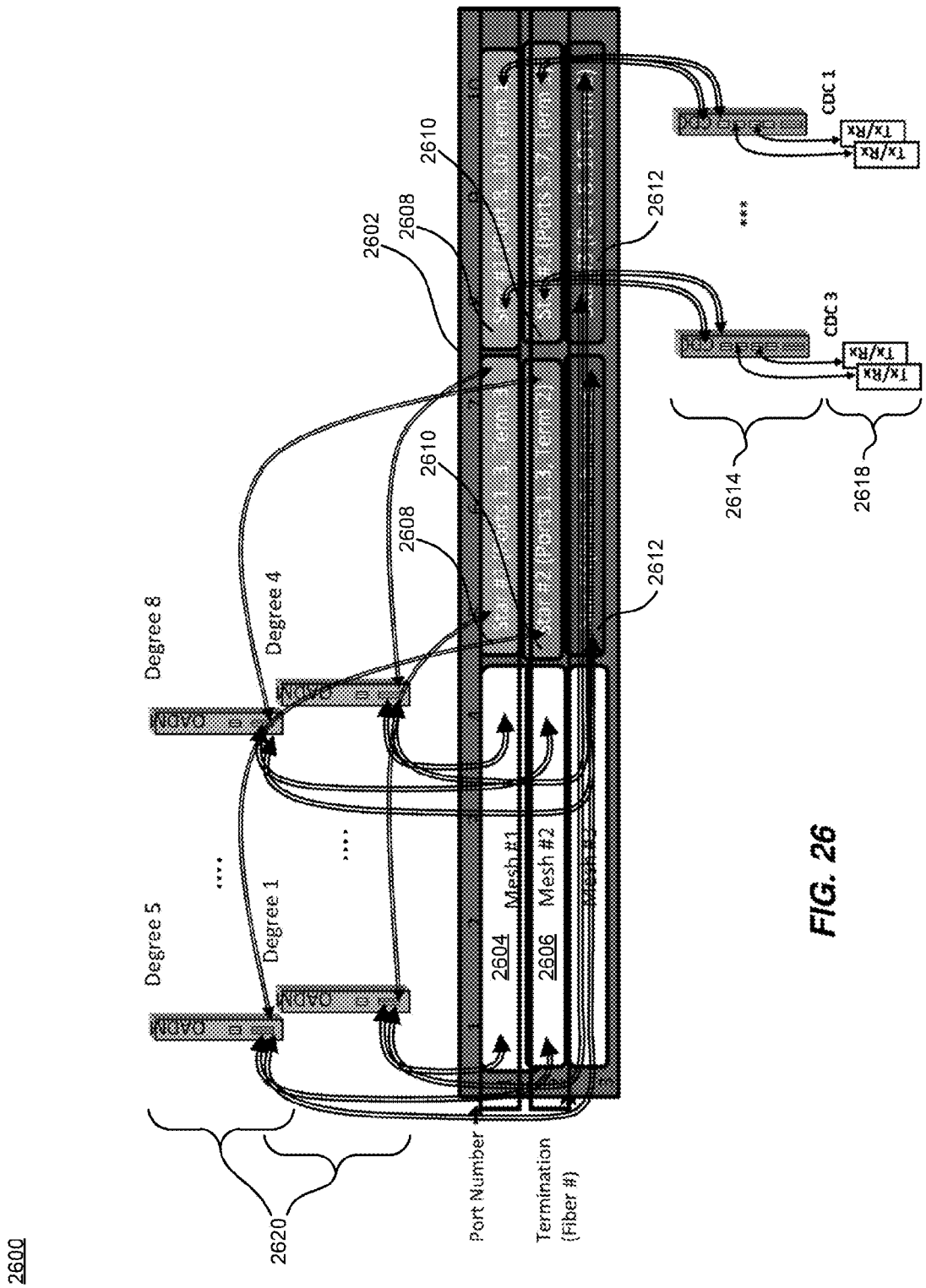
FIG. 26 illustrates how components of an example 8-degree ROADM system, including an example fiber shuffle, can be interconnected, in accordance with an example embodiment herein.

The 10-port shuffle 2502 can be dynamically grown as the number of ROADM degrees or CDC add/drop modules are increased. FIG. 26 illustrates how components of an example 8-degree ROADM system 2600, including an example fiber shuffle 2602, can be interconnected, in accordance with an example embodiment herein. This example utilizes two mesh topologies 2604 and 2606 and three star topologies 2608, 2610, and 2612. Each of the line degree modules 2620 for degree 1 through degree 4 is coupled both to mesh topology 2604 and star topology 2612. Each of the line degree modules 2620 for degree 5 through degree 8 is coupled both to mesh topology 2606 and star topology 2612. In one example embodiment, the line degree modules 2620 for degrees 1 through 4 are coupled to the line degree modules 2620 for degrees 5 through 8 by way of the star topology 2612. CDC add/drop modules 2614 are interposed and coupled between the star topologies 2608 and 2610 and local transponders 2618. In one example, the CDC add/drop modules 2614 are coupled to each of the line degree modules 2620 for degree 1 through degree 4 by way of the star topology 2608, and the CDC add/drop modules 2614 are coupled to each of the line degree modules 2620 for degree 5 through degree 8 by way of the star topology 2610.

Having described example arrangements and mappings of a front panel of a shuffle of a ROADM, reference will now be made to FIG. 27 to describe how various subtopologies may be mapped (e.g., hardwired) to ports (fibers thereof) of a shuffle front panel to provide flexibility as routing needs may evolve.

Figure 27:
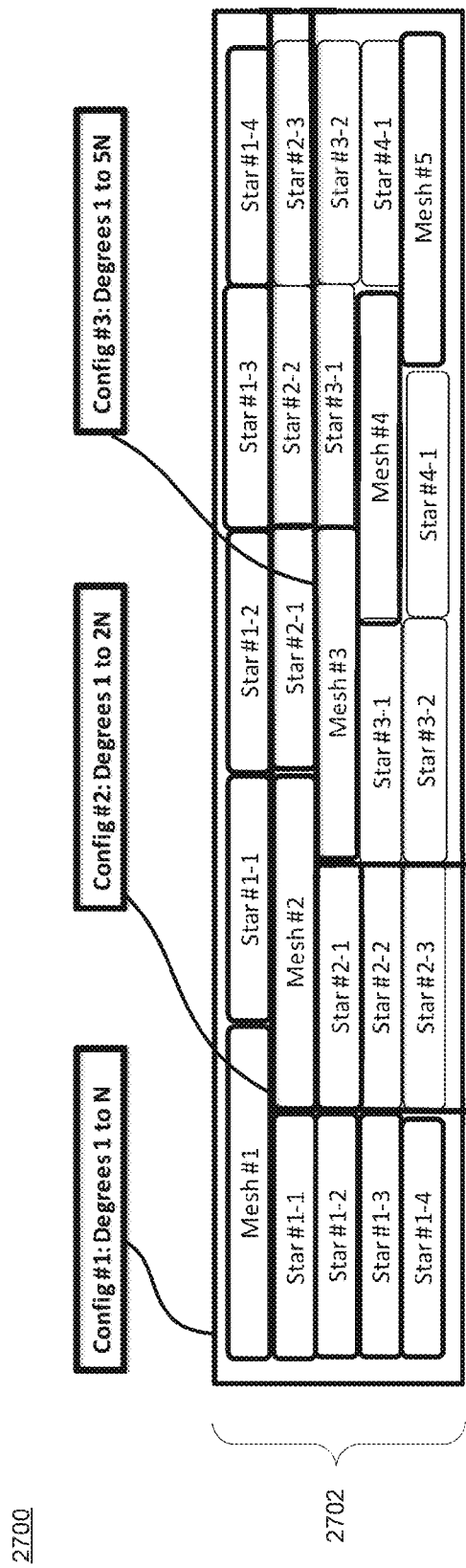
FIG. 27 shows an example fiber shuffle having multiple individual mesh topologies and star topologies, in accordance with an example embodiment herein.

FIG. 27 shows an example N-port fiber shuffle 2700 having multiple individual mesh topologies and star topologies mapped to the ports thereof, and having 5 multi-fiber MPO terminations 2702, each termination 2702 having (N−1)/5 fiber pairs. The size of each mesh topology and/or star topology in the shuffle 2700 can be configured based on the number of fibers included in each multi-fiber MPO termination 2702 of the shuffle 2700. For example, if the shuffle 2700 includes MPO terminations having 8 fibers (which can support 4 bidirectional circuits), each mesh would have a total of 5 MPO terminations and be arranged in a manner similar to that of the 3 bidirectional termination example embodiments described above. In this case, the star topology would have a total of 8 MPO terminations and be arranged in a manner similar to that described above in connection with the star topology 1900 of FIG. 19.

In one example embodiment, a fiber shuffle (e.g., such as the shuffle 2700) can be constructed in the following manner. Given R rows of connectors (e.g., MPO connectors), where each connector supports N fiber ingress/egress pairs (i.e., 2×N fibers total per connector), the number of columns is computed according to Equation 1 shown below.

$$R \times (N+1) \qquad \text{(Equation 1)}$$

The mesh size is (N+1) connectors, and the star size is (2×N) connectors. R mesh topologies and (R−1)! star topologies can be utilized to fully populate an R-row fiber shuffle. The number of degrees supported by the mesh is N degrees when CDC add/drop modules that support N degrees are coupled to the shuffle.

Illustrated in FIG. 27 is a layout of a possible 21-port shuffle 2700 having a front panel with multiple mesh topologies and star topologies mapped to its ports thereby providing three possible configurations, depending upon which ports are utilized. In a first configuration (labeled configuration 1 in FIG. 27), the shuffle 2700 can support N (e.g., 4) degrees (or combinations of line degree modules and CDC add/drop modules), with as many as 17 CDC add/drop modules, and only employs a single mesh topology (labeled in FIG. 27 as mesh 1) and four star topologies (labeled in FIG. 27 as star 1-1, star 1-2, star 1-3, and star 1-4). In this example, it is possible to add star topologies to the shuffle as the number of CDC add/drop modules increases.

In a second configuration (labeled configuration 2 in FIG. 27), the shuffle 2700 can support 2*N (e.g., 8, where N=4) degrees (or combinations of line degree modules and CDC add/drop modules), and, in addition to the topologies employed in configuration 1 (i.e., mesh 1, star 1-1, star 1-2, star 1-3, and star 1-4), employs a second mesh topology (labeled mesh 2 in FIG. 27), and additional star topologies (labeled in FIG. 27 as star 2-1, star 2-2, and star 2-3). One of the additional star topologies interconnecting degrees 1 through degree 4 with degree 5 through degree 8, and the remaining additional star topologies can each support an additional CDC add/drop module. In this example embodiment, the number of star topologies required can depend on the number of CDC add/drop modules desired.

In a third configuration (labeled configuration 3 in FIG. 27), the 21-port shuffle 2700 employs a total of 5 mesh topologies (labeled in FIG. 27 as mesh 1, mesh 2, mesh 3, mesh 4, and mesh 5) and 10 star topologies (labeled in FIG. 27 as star 1-1, star 1-2, star 1-3, star 1-4, star 2-1, star 2-2, star 2-3, star 3-1, star 3-2, and star 4-1), thereby accommodating up to 5*N (e.g., 20, where N=4) possible degrees (or combinations of line degree modules and CDC add/drop modules).

Figure 28:
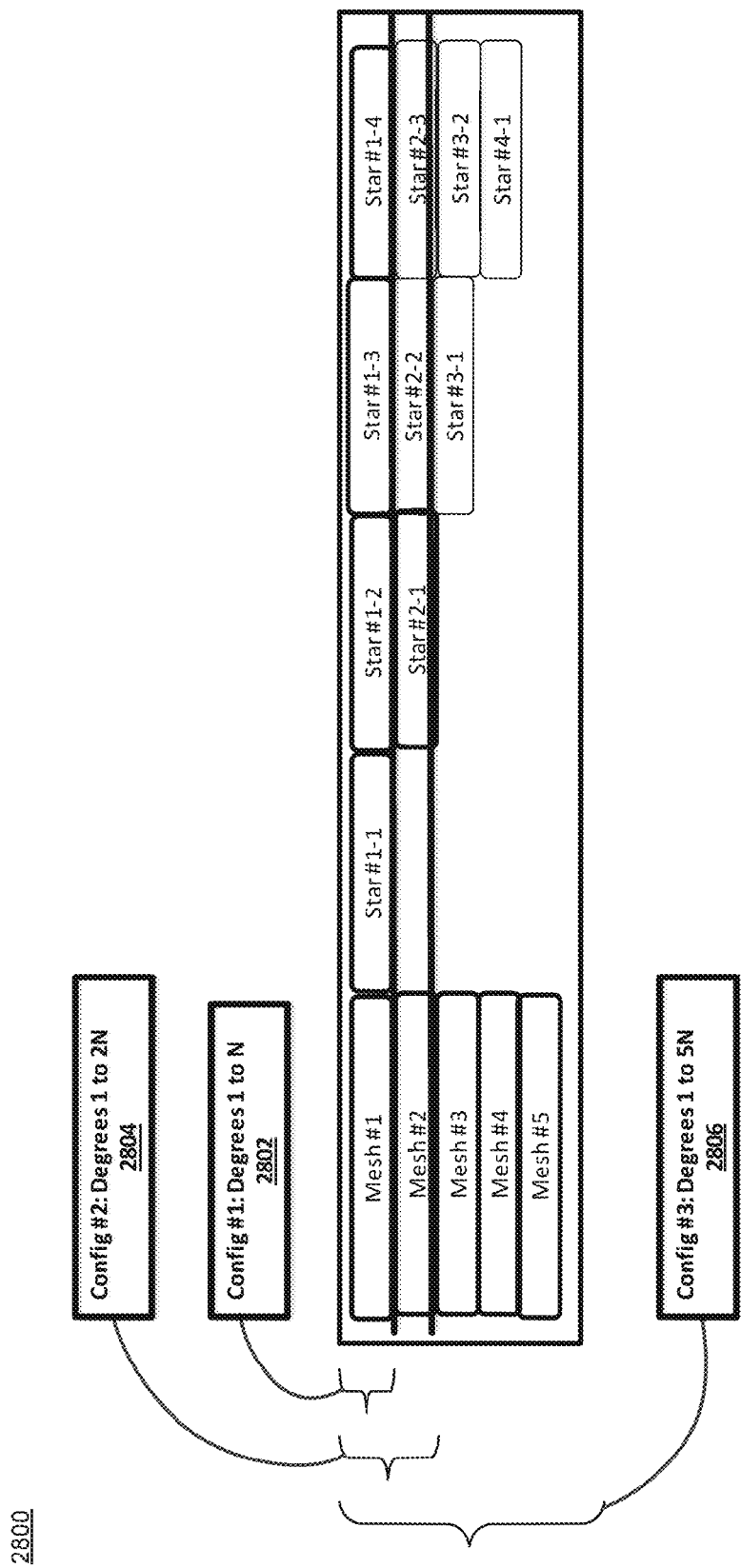
FIG. 28 shows another example embodiment of a 21-port expandable shuffle, in accordance with an example embodiment herein.

FIG. 28 shows yet another example embodiment of a 21-port expandable shuffle 2800. In this example embodiment, each of three configurations (configuration 1, configuration 2, and configuration 3) employs one or more rack-mountable units 2802, 2804, 2806, each rack-mountable unit of which having a total of 5 slots capable of hosting either a mesh topology module or star topology module. Configuration 1 employs one rack-mountable unit 2802 that includes one mesh topology module and four star topology modules. Configuration 2 employs the same rack-mountable unit 2802 as employed in configuration 1, and also includes a second rack-mountable unit 2804 that includes one mesh topology module and three star topology modules. Configuration 3 employs the same rack-mountable units 2802 and 2804 as those employed in configuration 2, and also includes a third rack-mountable unit 2806, which includes three mesh topology modules and three star topology modules. Thus, in total, configuration 3 includes five mesh topology modules and ten star topology modules. Because the mesh topology modules and star topology modules are mutually independent, each of the modules can be populated in the shuffle 2800 in a position that does not depend on a position of any other modules.

Figure 29:
FIG. 29 shows an example 21-port shuffle, in accordance with an example embodiment herein.
Figure 30:
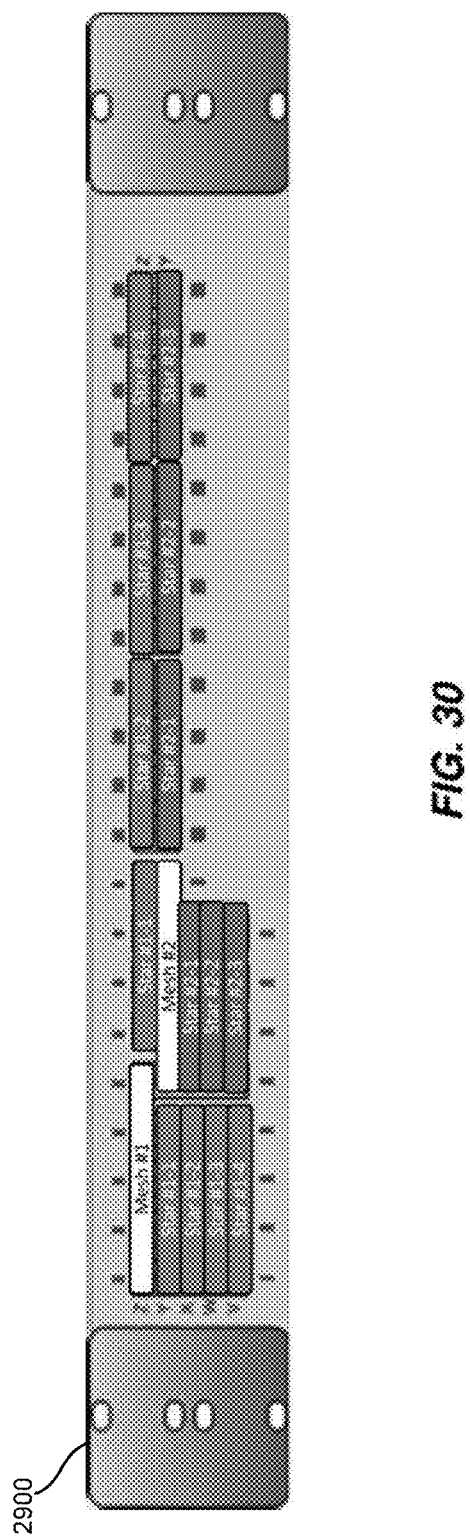
FIG. 30 shows an example mapping of mesh topology modules and star topology modules to a fiber shuffle, in accordance with an example embodiment herein.

FIG. 29 shows a 21-port shuffle 2900 employed to implement configuration 2 described above in the context of FIG. 28, in accordance with an example embodiment herein. In this example, the shuffle 2900 is tailored to support the maximum possible number of line degree modules and CDC add/drop modules in an 8-degree optical network, without requiring the shuffle 2900 to have a number of MPO connectors sufficient to provide complete connectivity between line degree modules and CDC add/drop modules for a full 21-degree optical network. FIG. 30 shows another view of an example mapping of mesh topology modules and star topology modules to the shuffle 2900 (FIG. 29), optimized for 8 degrees, in accordance with configuration 2 described above in connection with FIG. 27.

Reference will now be made to FIGS. 31 through 35 to describe how front panels of a shuffle may be modularized, for example, to increase the flexibility and ease of reconfiguration a shuffle and/or a ROADM employing a shuffle. In some example embodiments herein, components shown in FIGS. 31 through 35 can correspond to similar components described above and/or shown in other ones of the figures. FIG. 31 and FIG. 32 show an example 5-port mesh topology module 3100 and an example 8-port star topology module 3200, respectively, each of which may be used to construct a shuffle such as the shuffle 2900 shown in FIG. 29.

FIG. 33 shows an example 21-port 4-degree shuffle 3300 constructed using a single mesh topology module 3100 and four star topology modules 3200 in a standard EIA rack unit mountable shelf. In this example the star topology modules 3200 only need to be added as CDC add/drop modules are added to the system. As shown in FIGS. 21 and 22, the line degree modules of the system would be coupled to the star topology modules 3200. FIG. 34 shows the example 21-port 4-degree shuffle 3300 described above in connection with FIG. 33, with blocks indicating how the mesh topology module and star topology modules are mapped in the EIA shelf.

FIG. 35 shows how an 8-degree 21-port shuffle can be constructed, in an example embodiment herein, by using two 1-rack unit mountable shelves 3502 and 3504. In this example, the second shelf 3505 includes a mesh topology module and can include up to three star topology modules. This approach can be used to grow the one-shelf 4-degree configuration described above in connection with FIG. 33 and FIG. 34 into an 8-degree configuration by adding the second shelf 3504 and the appropriate mesh topology modules and star topology modules.

As can be appreciated in view of the above, the example aspects herein provide an intranodal reconfigurable optical add/drop multiplexer (ROADM) fiber management apparatus, and a system employing the apparatus. In accordance with some aspects described herein, the system employs a fiber shuffle and fiber ribbon cables that greatly simplify the management of intranodal (i.e., intra-ROADM) paths for express and local add/drop channels in an optical network. In some example embodiments, to aid in the installation, test, and identification of intranodal interconnections, optical test channels can be routed between modules (e.g., line degree modules, CDC add/drop modules, expansion modules, local transponders, etc.) in parallel with the add, drop, and/or express channels using a separate WDM channel. The test channels can be used between the modules to verify proper intranodal fiber setup, failure analysis, and to discover the port interconnections between the modules within the node.

Additionally, in accordance with various example aspects described herein, a fiber shuffle is provided that is flexible enough to manage a range of numbers and types of modules of a ROADM (e.g., line degree modules, CDC add/drop modules, local transponders, expansion modules, etc.). The fiber shuffle includes a plurality of ports, each of which can be used for various types of modules of a ROADM.

In addition, in some example embodiments herein, a fiber shuffle is provided wherein one or more mesh topologies and/or one or more star topologies are located in a shelf (or rack-mountable chassis) that also includes one or more line degree modules and/or one or more add/drop modules (e.g., CDC add/drop modules). In this way, cabling external to the shelf may not be required between the one or more mesh topologies, the one or more star topologies, the one or more line degree modules, and/or the one or more add/drop modules.

It should be noted that the network configurations represented in the figures described herein are merely provided for illustrative purposes, and should not be construed as limiting the scope of the invention. Also, in other embodiments, the networks may have other configurations than those shown in the figures.

Additionally, while specific implementations of the invention may have been described, the invention need not be so limited. For example, various embodiments of the invention may comprise different number of ports other than those described in this disclosure.

In the foregoing description, example aspects of the invention are described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

Software embodiments of example aspects described herein may be provided as a computer program product, or software, that may include an article of manufacture on a machine-accessible, computer-readable, and/or machine-readable medium (memory) having instructions. The instructions on the machine-accessible, computer-readable and/or machine-readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "machine-accessible medium", "computer-readable medium", "machine-readable medium", or "memory" used herein shall include any medium that is capable of storing, encoding, or transmitting a sequence of instructions for execution by the machine and that cause the machine to perform any one of the procedures described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. In other embodiments, functions performed by software can instead be performed by hardcoded modules, and thus the invention is not limited only for use with stored software programs. Indeed, the numbered parts of the above-identified procedures represented in the drawings may be representative of operations performed by one or more respective modules, wherein each module may include software, hardware, or a combination thereof.

In addition, it should be understood that the figures illustrated in the attachments, which highlight the functionality and advantages of the present invention, are presented for example purposes only. The architecture of the example aspect of the present invention is sufficiently flexible and configurable, such that it may be utilized (and navigated) in ways other than that shown in the accompanying figures.

Although example aspects herein have been described in certain specific example embodiments, many additional modifications and variations would be apparent to those skilled in the art. It is therefore to be understood that the various example embodiments herein may be practiced otherwise than as specifically described. Thus, the present example embodiments, again, should be considered in all respects as illustrative and not restrictive.

What is claimed is:

1. An intranodal reconfigurable optical add/drop multiplexer (ROADM) fiber management apparatus, comprising:
an enclosure;
a plurality of optical connectors accessible via an exterior of the enclosure, the plurality of optical connectors including a plurality of ingress optical connectors and a plurality of egress optical connectors;

a plurality of ingress optical ports, each connected to a corresponding one of the plurality of ingress optical connectors and extending to an interior of the enclosure;

a plurality of egress optical ports, each connected to a corresponding one of the plurality of egress optical connectors and extending to the interior of the enclosure, wherein each of the plurality of ingress optical ports corresponds to one of the plurality of egress optical ports; and a plurality of optical interconnections interposed between ones of the plurality of ingress optical ports and ones of the plurality of egress optical ports, wherein, each one of the plurality of ingress optical ports is optically coupled by way of the optical interconnections to at least one of the plurality of egress optical ports to enable communication of signals from the coupled ingress optical port to the respective egress optical port, and each one of the plurality of egress optical ports is optically coupled by way of the optical interconnections to at least one of the plurality of ingress optical ports to enable communication of signals to the coupled egress optical port from the respective ingress optical port, wherein at least one of the optical connectors is configured to accept either one of a plurality of line degree modules or one of a plurality of local transponders communicatively coupled to one or more of a plurality of an add/drop modules, and wherein at least one or more of the plurality of line degree modules is communicatively coupled to one or more of the local transponders by way of at least one expansion line degree module, and one or more of the add/drop subsystems.

2. The apparatus of claim 1, wherein, for each one of the plurality of ingress optical ports, the respective ingress optical port is optically coupled by way of the optical interconnections to each one of the plurality of egress optical ports, excluding the one egress optical port that corresponds to the respective ingress optical port.

3. The apparatus of claim 1, wherein the enclosure is a single rack-mountable enclosure.

4. The apparatus of claim 3, wherein the plurality of optical interconnections is comprised of a plurality of topology modules including at least one of a mesh topology module and a star topology module.

5. The apparatus of claim 3, wherein individual ones of the plurality of ingress optical connectors correspond to respective ones of the plurality of egress optical connectors.

6. The apparatus of claim 4, wherein a contiguous group of ones of the plurality of ingress optical connectors is coupled, by way of the mesh topology module, to ones of the plurality of egress optical connectors that are adjacently arranged in the enclosure, and wherein at least one of the plurality of ingress optical connectors and a corresponding at least one of the plurality of egress optical connectors are terminated at a common termination.

7. The apparatus of claim 4, wherein a group of ones of the plurality of ingress optical connectors is coupled, by way of the star topology module, to a group of ones of the plurality of egress optical connectors, wherein at least one pair of corresponding ones of the optical ingress connectors and the optical egress connectors that is not included in the star topology module is interposed in the enclosure between the group of ones of the plurality of ingress optical connectors and the group of ones of the plurality of egress optical connectors.

8. The apparatus of claim 4, wherein the enclosure includes one or more vacant slots that can accommodate one or more additional topology modules.

9. The apparatus of claim 1, wherein the plurality of optical interconnections is comprised of a plurality of topology modules including at least one of a mesh topology module or a star topology module, and wherein each of the plurality of topology modules is coupled to at least one of (1) a contiguous group of adjacent ones of the plurality of ingress optical connectors and (2) a contiguous group of adjacent ones of the plurality of egress optical connectors.

10. The apparatus of claim 1, wherein each of the plurality of ingress optical ports includes a plurality of ingress optical fibers, and each of the plurality of egress optical ports includes a plurality of egress optical fibers.

11. The apparatus of claim 1, wherein a total number of the plurality of optical ingress ports included in the apparatus is equal to a total number of the plurality of optical egress ports included in the apparatus.

12. The apparatus of claim 1, wherein at least one of the optical connectors is configured to accept only one of a line degree module and an add/drop module.

13. An intranodal reconfigurable optical add/drop multiplexer (ROADM) fiber management system, comprising:

a fiber management apparatus including a plurality of optical connectors;

a line subsystem including a plurality of line degree modules, each of the line degree modules being coupled to a selected one of the plurality of optical connectors;

an add/drop subsystem including a plurality of add/drop modules, each of the add/drop modules being coupled to a selected one of the plurality of optical connectors;

a plurality of local transponders; and at least one expansion fiber management apparatus including at least one expansion line degree module, wherein one or more of the line degree modules is communicatively coupled to one or more of the local transponders by way of the fiber management apparatus and one or more of the add/drop subsystems to enable communication of signals between a respective line degree module and a respective add/drop subsystem, wherein at least one of the optical connectors is configured to accept either one of a line degree module and an add/drop module, and wherein one or more of the plurality of line degree modules is communicatively coupled to one or more of the local transponders by way of the fiber management apparatus, the at least one expansion line degree module of the expansion fiber management apparatus, and one or more of the add/drop subsystems.

14. The system of claim 13, wherein the plurality of optical connectors includes a plurality of ingress optical connectors and a plurality of egress optical connectors, wherein the fiber management apparatus further includes:

a plurality of ingress optical ports, each connected to a corresponding one of the plurality of ingress optical connectors;

a plurality of egress optical ports, each connected to a corresponding one of the plurality of egress optical connectors, wherein each of the plurality of ingress optical ports corresponds to one of the plurality of egress optical ports; and a plurality of optical interconnections interposed between ones of the plurality of ingress optical ports and ones of the plurality of egress optical ports, and wherein, each one of the plurality of ingress optical ports is optically coupled by way of the optical interconnections to at least one of the plurality of egress optical ports, and each one of the plurality of egress optical ports is optically coupled by way of the optical interconnections to at least one of the plurality of ingress optical ports.

15. The system of claim 13, wherein the plurality of line degree modules include at least one of (1) a broadcast-and-select line degree module that includes a splitter and a select wavelength selective switch (WSS) and (2) a route-and-select line degree module that includes a route WSS and a select WSS.

16. The system of claim 13, wherein the plurality of add/drop modules includes at least one of (1) a colorless, directionless, and contentionless (CDC) add/drop module having an erbium-doped fiber amplifier and a multicast switch and (2) a low port count (LPC) CDC add/drop module.

17. The system of claim 13, further comprising a plurality of expansion line degree modules, wherein each of the plurality of line degree modules is communicatively coupled to one or more of the local transponders by way of the fiber management apparatus, one of the expansion line degree modules, and one or more of the add/drop subsystems.

18. The system of claim 13, wherein the expansion fiber management apparatus includes a plurality of expansion line degree modules, the plurality of expansion line degree modules including at least one of (1) a broadcast-and-select expansion line degree module that includes a splitter and a select wavelength selective switch (WSS) and (2) a route-and-select expansion line degree module that includes a route WSS and a select WSS.

19. The system of claim 18, wherein the fiber management apparatus is housed in a first rack-mountable enclosure, and the expansion fiber management apparatus is housed in a second rack-mountable enclosure.

20. The system of claim 13, wherein at least two of (1) one or more of the plurality of line degree modules, (2) one or more of the plurality of add/drop modules, (3) one or more of the plurality of local transponders, and (4) the fiber management apparatus are optical coupled to one another by way of one or more optical ribbon cables.

21. The system of claim 13, wherein the system is coupled to an optical network by way of at least one wavelength division multiplexed path.

22. The system of claim 13, wherein at least one of the optical connectors is configured to accept only one of a line degree module and an add/drop module.

* * * * *